(12) United States Patent
Migos et al.

(10) Patent No.: US 8,572,481 B2
(45) Date of Patent: Oct. 29, 2013

(54) DEVICE, METHOD, AND GRAPHICAL USER INTERFACE FOR DISPLAYING ADDITIONAL SNIPPET CONTENT

(75) Inventors: Charles J. Migos, San Bruno, CA (US); Jay Christopher Capela, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 13/077,843

(22) Filed: Mar. 31, 2011

(65) Prior Publication Data

US 2012/0240037 A1 Sep. 20, 2012

Related U.S. Application Data

(60) Provisional application No. 61/452,621, filed on Mar. 14, 2011.

(51) Int. Cl.
*G06F 17/00* (2006.01)

(52) U.S. Cl.
USPC ........... 715/253; 715/243; 715/252; 715/256; 715/863

(58) Field of Classification Search
USPC ......... 715/203, 273, 788, 863, 243, 252, 253, 715/256

See application file for complete search history.

(56) References Cited

U.S. PATENT DOCUMENTS

| | | | | |
|---|---|---|---|---|
| 5,305,017 A | * | 4/1994 | Gerpheide | 345/174 |
| 6,714,221 B1 | * | 3/2004 | Christie et al. | 715/784 |
| 7,469,381 B2 | * | 12/2008 | Ording | 715/702 |
| 2006/0026521 A1 | * | 2/2006 | Hotelling et al. | 715/702 |
| 2009/0278806 A1 | * | 11/2009 | Duarte et al. | 345/173 |
| 2009/0307188 A1 | * | 12/2009 | Oldham et al. | 707/3 |
| 2010/0088641 A1 | | 4/2010 | Choi | |
| 2010/0283743 A1 | | 11/2010 | Coddington | |
| 2012/0127082 A1 | * | 5/2012 | Kushler et al. | 345/169 |

* cited by examiner

*Primary Examiner* — Stephen Hong
*Assistant Examiner* — Matthew Ludwig
(74) *Attorney, Agent, or Firm* — Morgan, Lewis & Bockius LLP

(57) ABSTRACT

An electronic device concurrently displays snippets including a first snippet and a second snippet. The first snippet includes first displayed snippet content corresponding to a first portion of content from a document associated with the first snippet. The second snippet includes second displayed snippet content corresponding to a second portion of content from a document associated with the second snippet. The device detects a gesture associated with the first snippet, which includes detecting a first contact and a second contact and detecting movement of the first contact relative to the second contact. In response, the device modifies the first snippet to include an additional portion of content from the document associated with the first snippet that was not included in the first displayed snippet content and maintains display of the second snippet without adding any additional content from the document associated with the second snippet.

31 Claims, 24 Drawing Sheets

DEVICE, METHOD, AND GRAPHICAL USER INTERFACE FOR DISPLAYING ADDITIONAL SNIPPET CONTENT

RELATED APPLICATIONS

This application claims priority to U.S. Provisional Application Ser. No. 61/452,621, filed Mar. 14, 2011, entitled "Device, Method, and Graphical User Interface for Displaying Additional Snippet Content," which is incorporated by reference herein in its entirety.

TECHNICAL FIELD

This relates generally to electronic devices with touch-sensitive surfaces, including but not limited to electronic devices with touch-sensitive surfaces that concurrently display snippets of information, such as snippets of search results.

BACKGROUND

Users often need to perform an electronic search and then analyze a set of search results. The electronic search may be wide-ranging or narrowly focused. In some cases, the search is global in nature, spanning the Internet. In other cases, the search is within a single electronic document, such as an electronic book, newspaper, magazine, or other digital publication.

The search results often include corresponding snippets of information that help the user select and view content (e.g., a document or portion thereof) corresponding to an individual search result that is closest to what the user is looking for.

But existing methods for using snippets to select and view content corresponding to an individual search result are cumbersome and inefficient. For example, a snippet may not provide adequate context for the text included in the snippet, so the user has to select the search result and view the content corresponding to the search result to ascertain whether the content matches the user's needs. Going back and forth between viewing search result snippets and viewing content corresponding to individual search results is tedious and creates a significant cognitive burden on a user. In addition, existing methods for viewing and using snippets to select content (e.g., a search result) that is closest to what the user is looking for take longer than necessary, thereby wasting energy. This latter consideration is particularly important in battery-operated devices.

SUMMARY

Accordingly, there is a need for electronic devices with faster, more efficient methods and interfaces for using snippets to select content, such as a search result. Such methods and interfaces may complement or replace conventional methods for using snippets to select content. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: concurrently displaying a plurality of snippets including a first snippet and a second snippet, where the first snippet includes first displayed snippet content corresponding to a first portion of content from a document associated with the first snippet, and the second snippet includes second displayed snippet content corresponding to a second portion of content from a document associated with the second snippet; detecting a first gesture associated with the first snippet, where detecting the first gesture includes detecting a first contact and a second contact on the touch-sensitive surface and detecting movement of the first contact relative to the second contact on the touch-sensitive surface; and in response to detecting the movement of the first contact relative to the second contact, modifying the first snippet to include an additional portion of content from the document associated with the first snippet that was not included in the first displayed snippet content, and maintaining display of the second snippet without adding any additional content from the document associated with the second snippet to the second snippet.

In accordance with some embodiments, an electronic device includes a display, a touch-sensitive surface, one or more processors, memory, and one or more programs. The one or more programs are stored in the memory and configured to be executed by the one or more processors. The one or more programs include instructions for performing the operations of the method described above. In accordance with some embodiments, a graphical user interface on an electronic device with a display, a touch-sensitive surface, a memory, and one or more processors to execute one or more programs stored in the memory includes one or more of the elements displayed in the method described above, which are updated in response to inputs, as described in the method above. In accordance with some embodiments, a computer readable storage medium has stored therein instructions which when executed by an electronic device with a display and a touch-sensitive surface, cause the device to perform the operations of the method described above. In accordance with some embodiments, an electronic device includes: a display; a touch-sensitive surface; and means for performing the operations of the method described above. In accordance with some embodiments, an information processing apparatus, for use in an electronic device with a display and a touch-sensitive surface, includes means for performing the operations of the method described above.

In accordance with some embodiments, an electronic device includes a display unit configured to concurrently display a plurality of snippets including a first snippet and a second snippet, where: the first snippet includes first displayed snippet content corresponding to a first portion of content from a document associated with the first snippet; and the second snippet includes second displayed snippet content corresponding to a second portion of content from a document associated with the second snippet; a touch-sensitive surface unit configured to receive user gestures; and a processing unit coupled to the display unit and the touch-sensitive surface unit. The processing unit is configured to: detect a first gesture associated with the first snippet, wherein detecting the first gesture includes detecting a first contact and a second contact on the touch-sensitive surface unit and detecting movement of the first contact relative to the second contact on the touch-sensitive surface unit; and in response to detecting the movement of the first contact relative to the second contact: modify the first snippet to include an additional portion of content from the document associated with the first snippet that was not included in the first displayed snippet content; and maintain display of the second snippet without adding any additional content from the document associated with the second snippet to the second snippet.

Thus, electronic devices with displays and touch-sensitive surfaces are provided with faster, more efficient methods and interfaces for using snippets to select content (e.g., a search result), thereby increasing the effectiveness, efficiency, and user satisfaction with such devices. Such methods and interfaces may complement or replace conventional methods for using snippets to select content.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
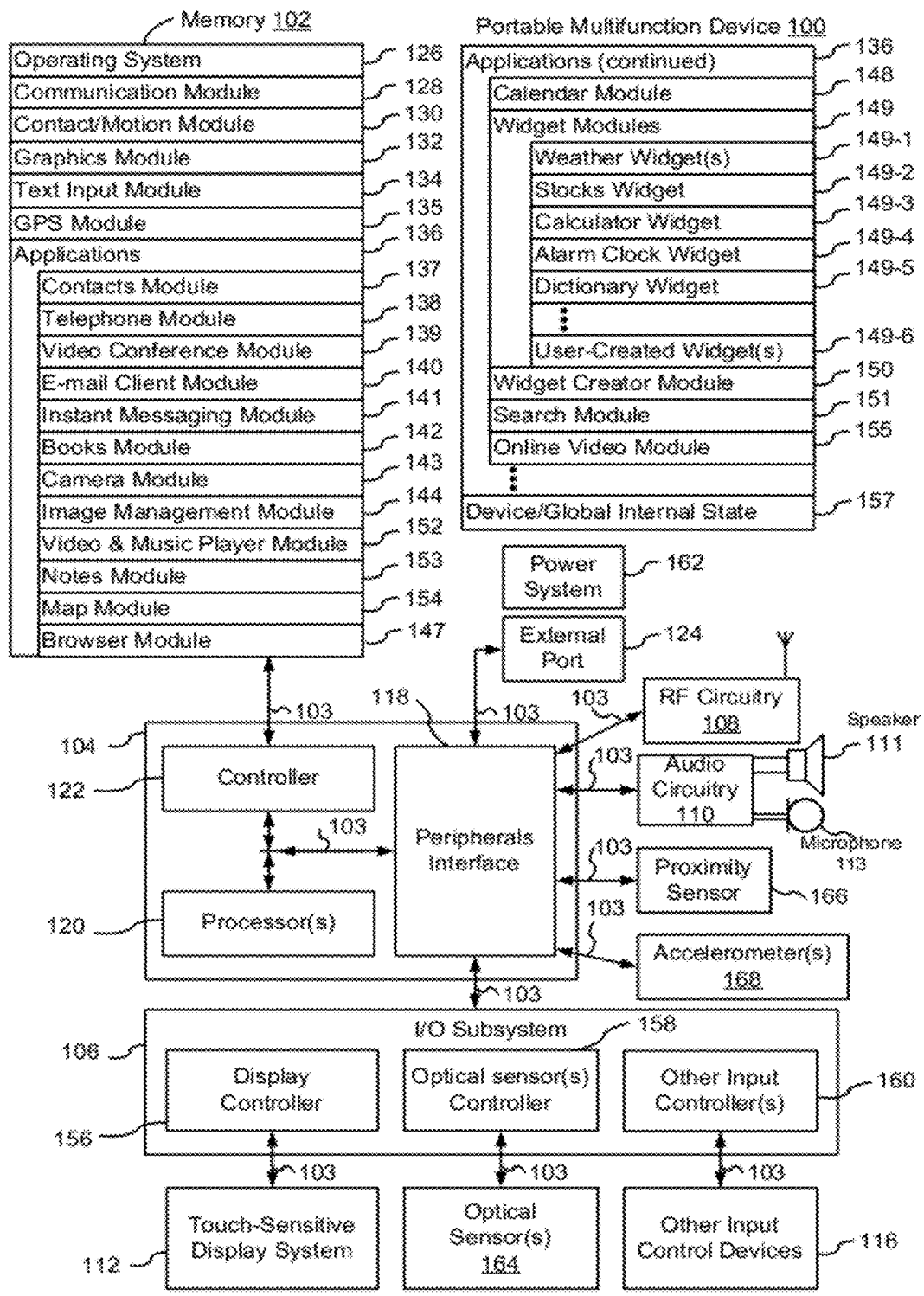
FIG. 1A is a block diagram illustrating a portable multifunction device with a touch-sensitive display in accordance with some embodiments.

Described below are devices and methods that enable a user to manipulate snippets, including adding additional content to a snippet, to help select content corresponding to a particular snippet.

The device concurrently displays a plurality of snippets, such as search result snippets. A multitouch gesture (e.g., a two-finger depinch gesture) is detected on a touch-sensitive surface of the device at a location that corresponds to one of the snippets. In response to detecting the multitouch gesture on a particular snippet, additional content is displayed for that particular snippet in accordance with the movement of the contacts in the multitouch gesture, while no additional content is displayed for the other snippets. This allows a user to view more of the content around the particular snippet, thereby providing additional context/information about the original content corresponding to the particular snippet. This additional context/information helps the user decide whether to switch to displaying just the content corresponding to the particular snippet (e.g., by extending the depinch gesture past a threshold) or to move on to analyze other snippets in the plurality of snippets (e.g., by ceasing the depinch gesture below the threshold).

Below, FIGS. 1A-1B, 2, 3, and 7 provide a description of exemplary devices. FIGS. 4A-4B and 5A-5M illustrate exemplary user interfaces for displaying additional snippet content to help select content, such as a search result. FIGS. 6A-6D are flow diagrams illustrating a method of using snippets to select content (e.g., a search result). The user interfaces in FIGS. 5A-5M are used to illustrate the processes in FIGS. 6A-6D.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
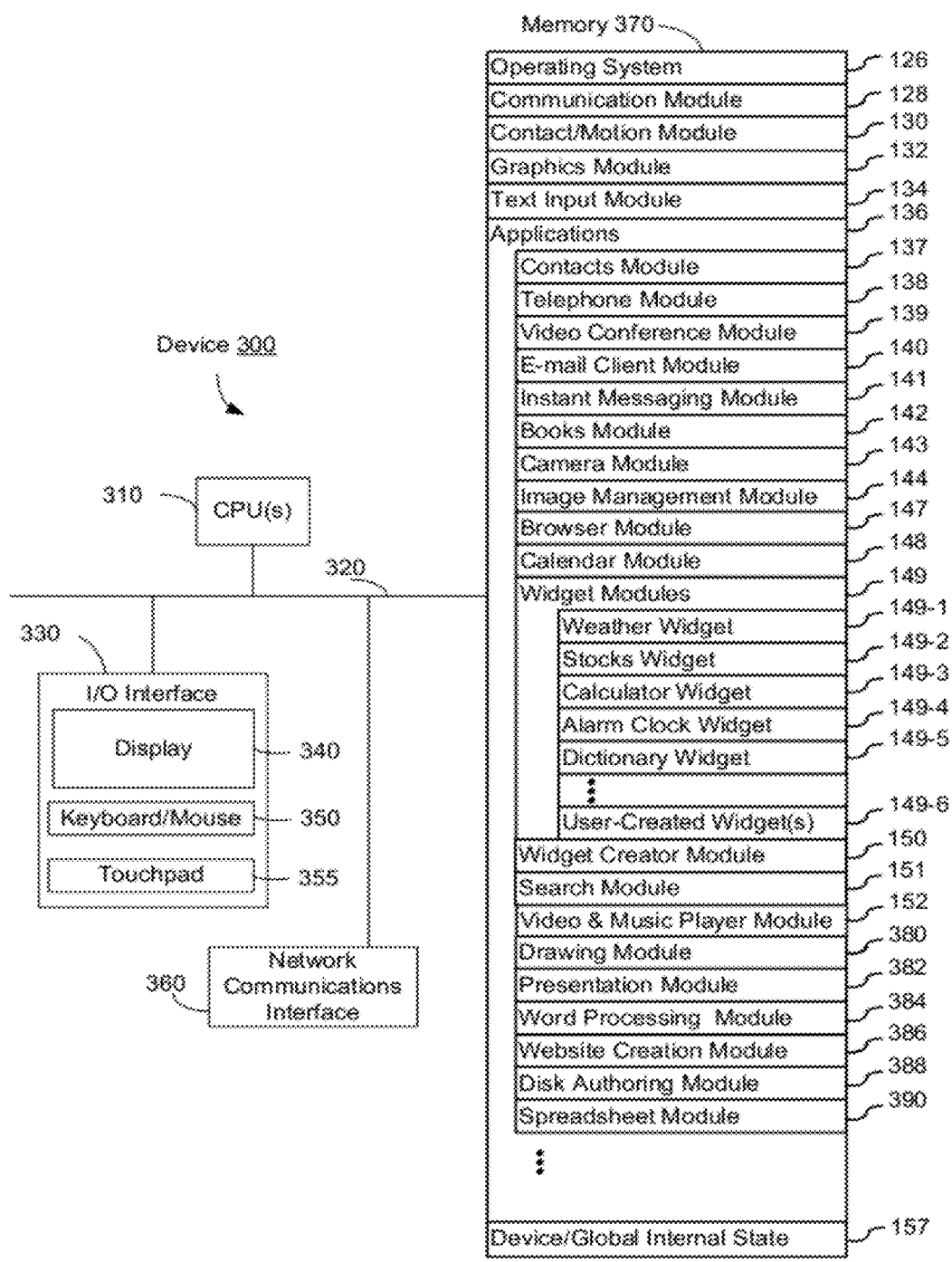
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of:

active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- books module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, books module 142 includes executable instructions to display, annotate, and share an electronic book (e.g., a text book), magazine, newspaper or other digital publication between a user and one or more other participants in accordance with user instructions.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
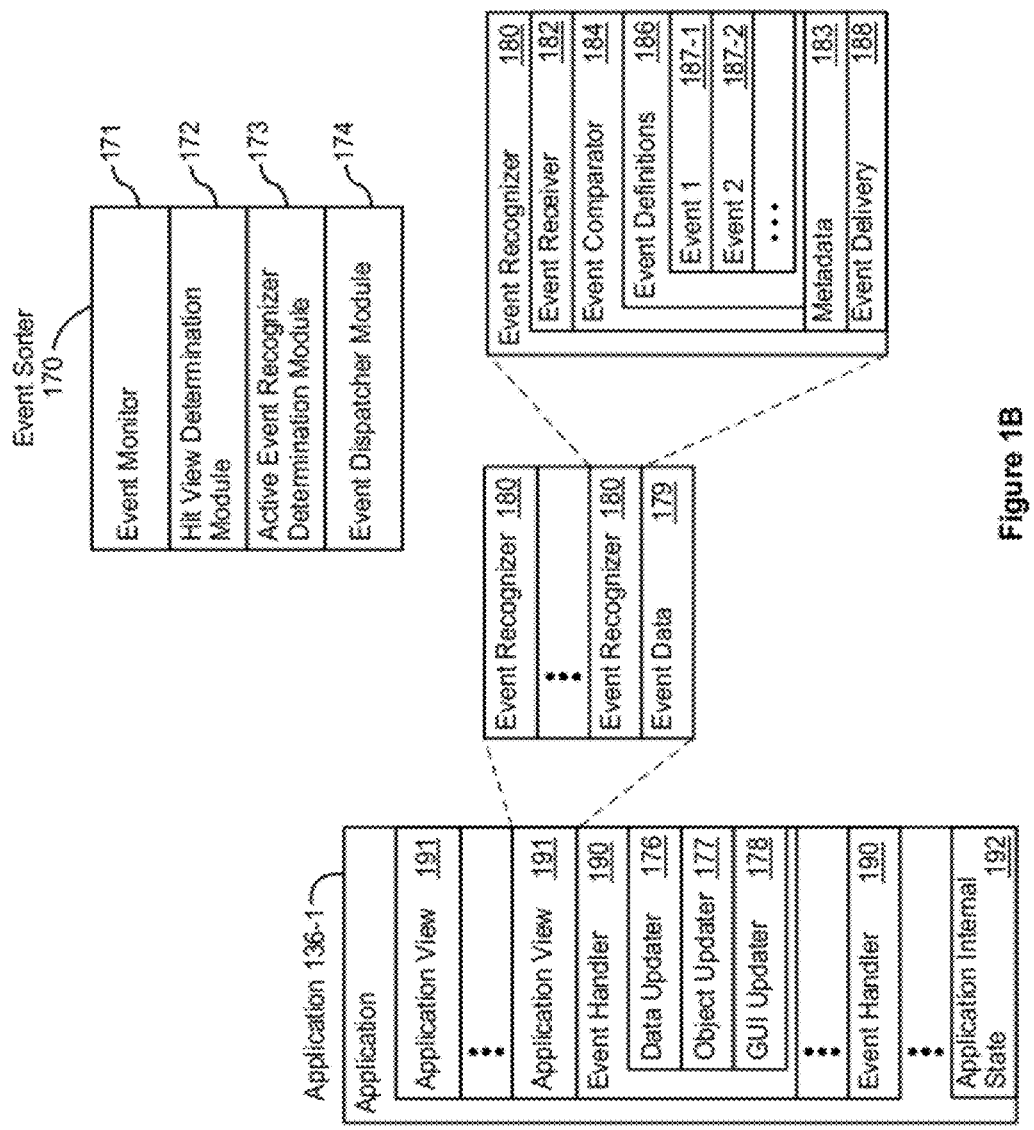
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
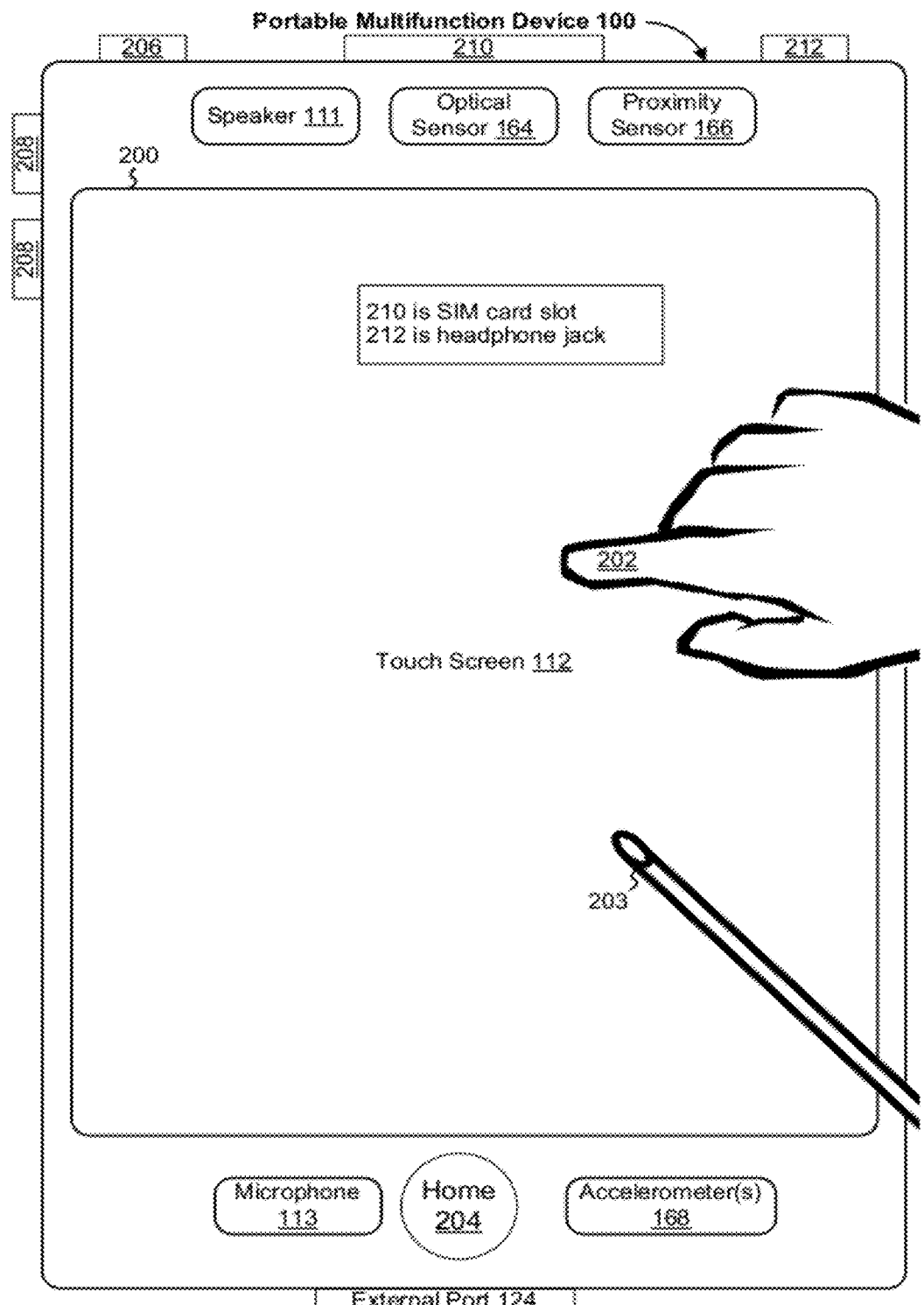
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
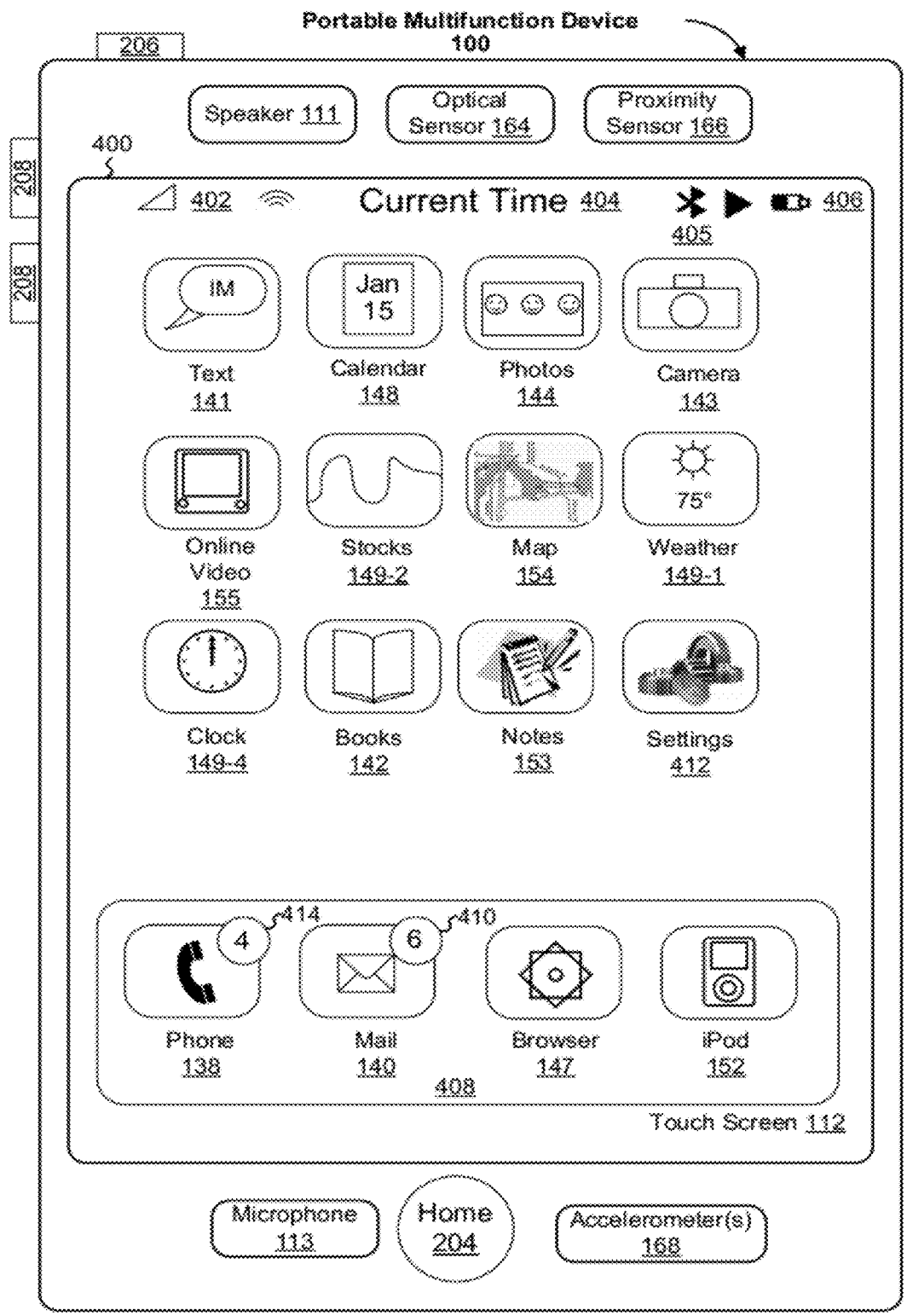
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
 Phone 138, which may include an indicator 414 of the number of missed calls or voicemail messages;
 E-mail client 140, which may include an indicator 410 of the number of unread e-mails;
 Browser 147; and
 Video and music player 152, also referred to as iPod (trademark of Apple Inc.) module 152; and
Icons for other applications, such as:
 IM 141;
 Image management 144;
 Camera 143;
 Weather 149-1;
 Stocks 149-2;
 Books 142;
 Calendar 148;
 Alarm clock 149-4;
 Map 154;
 Notes 153;
 Settings 412, which provides access to settings for device 100 and its various applications 136; and
 Online video module 155, also referred to as YouTube (trademark of Google Inc.) module 155.

Figure 4B:
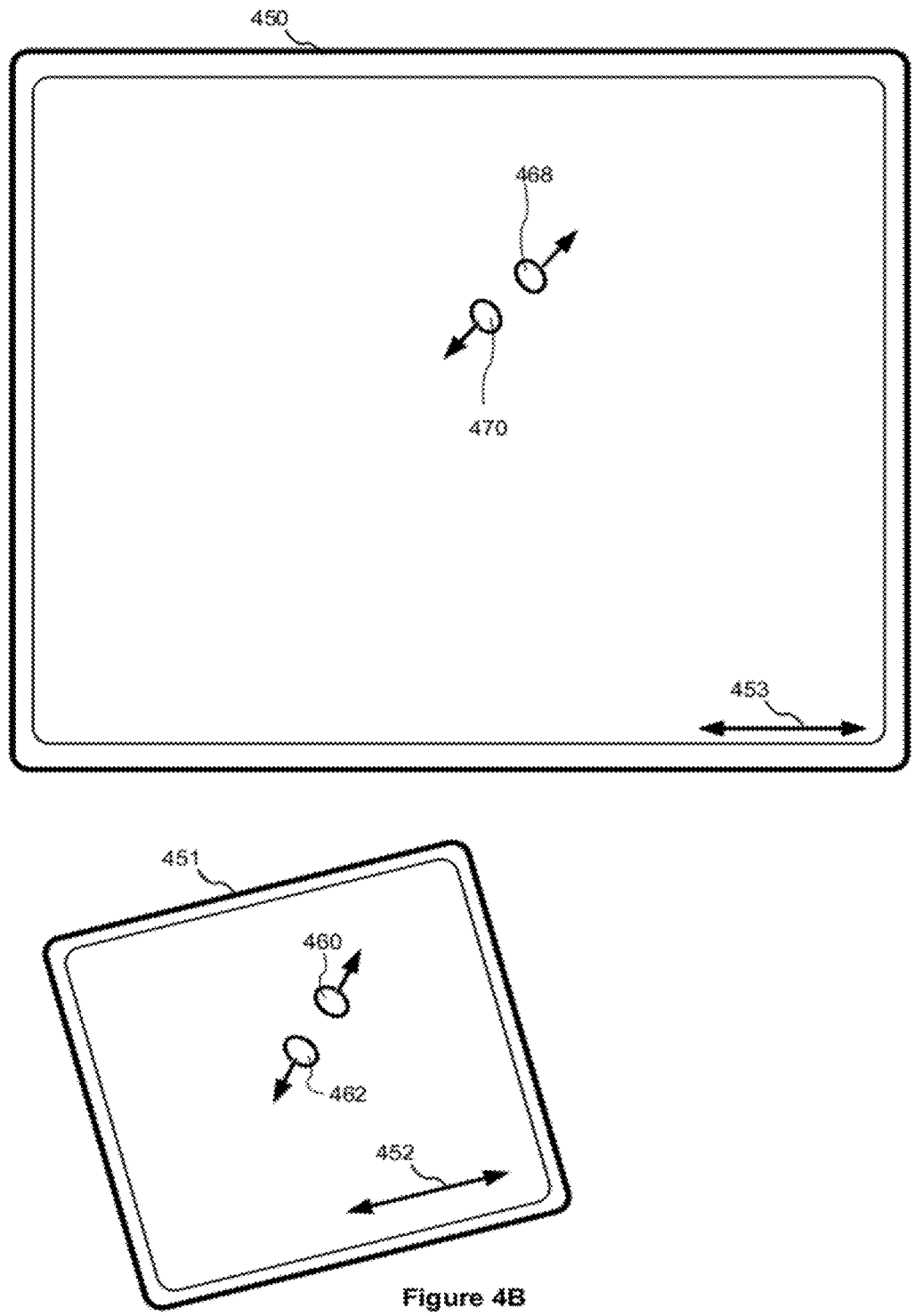
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5M illustrate exemplary user interfaces for using snippets to select a search result in accordance with some embodiments. The user interfaces in these figures are used to illustrate the processes described below, including the processes in FIGS. 6A-6D.

Figure 5A:
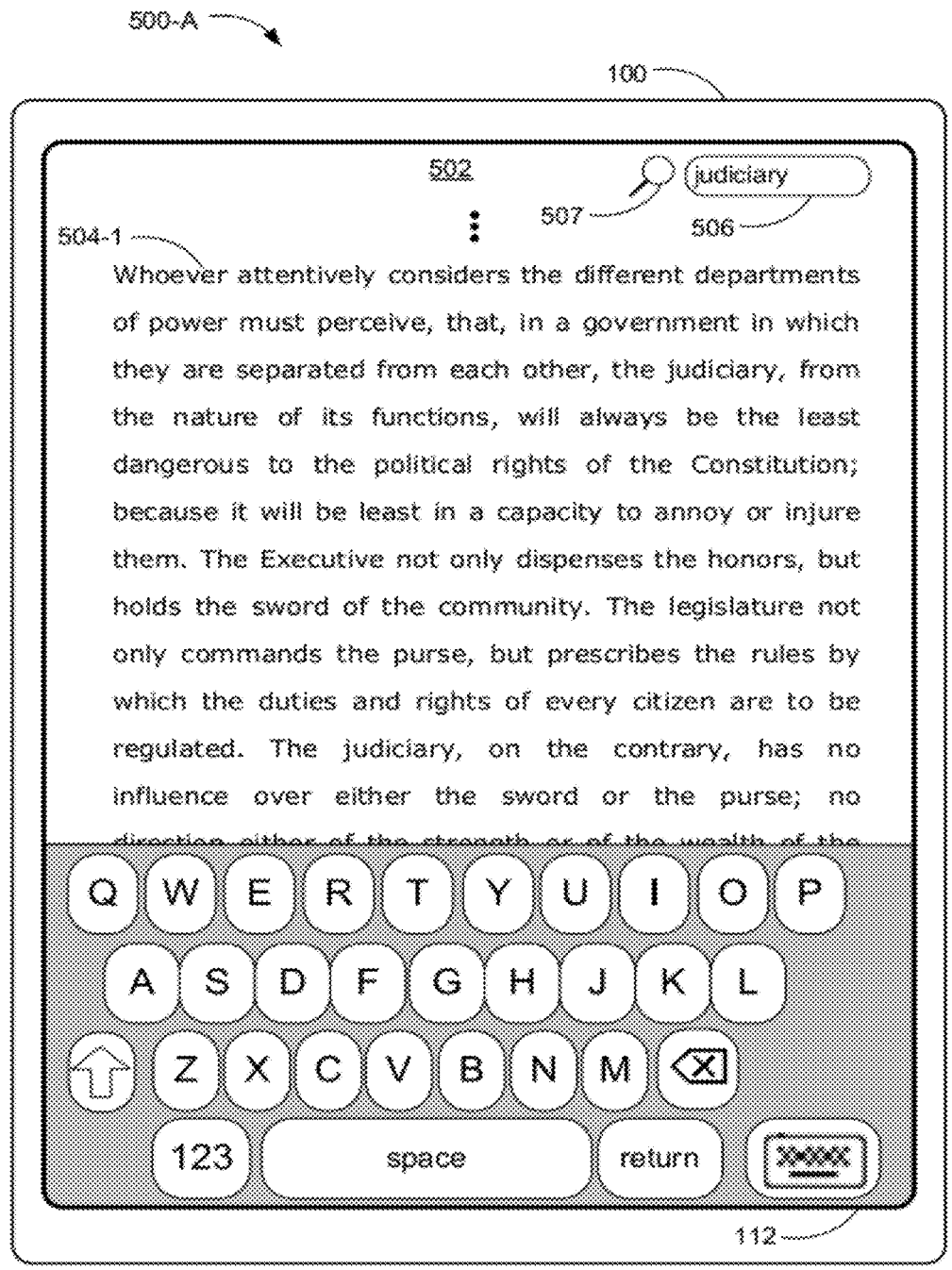
FIGS. 5A-5M illustrate exemplary user interfaces for using snippets to select a search result in accordance with some embodiments.

FIG. 5A illustrates user interface ("UI") 500-A. UI 500-A includes a portion (e.g., a page) of electronic document 502 (e.g., an electronic textbook, electronic book, electronic magazine, a Portable Document Format (PDF) document, word processing document, webpage, spreadsheet, desktop publishing document, slideshow document, drawing document, etc.) displayed on touch-sensitive display 112 of a device (e.g., device 100). Electronic document 502 includes content, such as text 504-1, and graphical objects (e.g., photos, charts, graphs, figures, images, etc.). In FIG. 5A, text 504-1 is a portion of text from the Federalist No. 78.

Figure 5B:
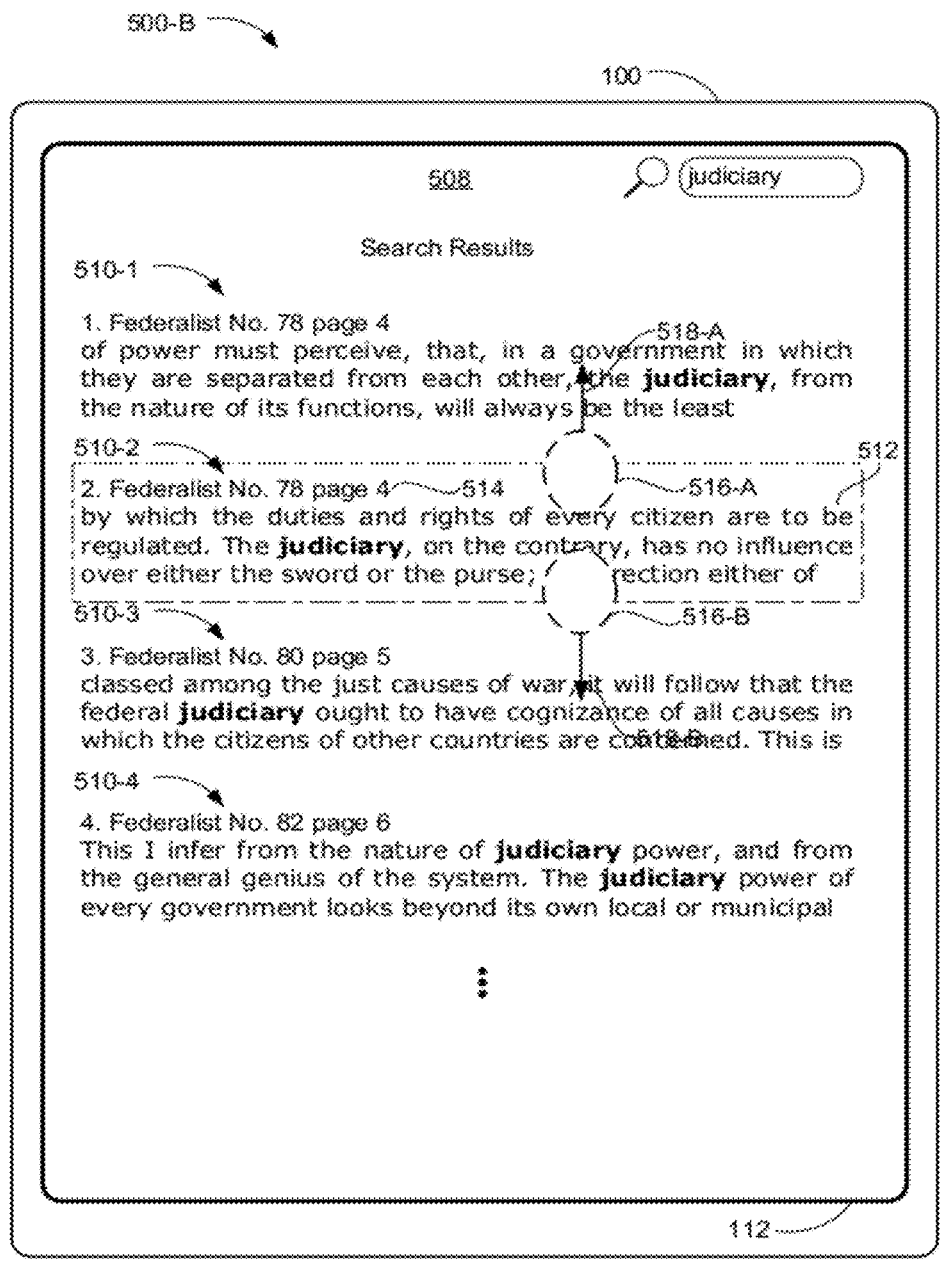

Search field 506 may be displayed along with electronic document 502. A user may type in a query term (e.g., one or more words, a phrase, etc.) into search field 506 and perform an input (e.g., a tap gesture on icon 507) to initiate a search query within electronic document 502 and optionally additional documents using the query term. For example, in FIG. 5A, a query term "judiciary" is typed into search field 506. In response to the search query with the query term "judiciary," search results 508 are displayed, as shown in FIG. 5B. In some embodiments, the search may cover multiple documents (e.g., a search of a user's library, an online library, or the Internet).

FIG. 5B illustrates UI 500-B. UI 500-B includes search results 508 for the search query with the query term "judiciary." Search results 508 include one or more search result snippets 510. A snippet 510 includes snippet content 512, which includes a portion of text or other content from a document (e.g., a portion of text where the query term is found). In some embodiments, the snippet includes a header 514 identifying the document or location from which the corresponding snippet content 512 is taken. For example, header 514 for snippet 510-2 identifies snippet content 512 of snippet 510-1 as taken from page 4 of the Federalist No. 78. In some embodiments, the query term is prominently displayed in the snippet content; the query term is displayed in boldface or highlighted, for example. For example, in snippets 510 in FIG. 5B, the query term "judiciary" is displayed in boldface.

In some embodiments, snippets from different documents and/or the same document are displayed concurrently. For example, search results 508 include snippets 510-1 and 510-2 that are from the same document (Federalist No. 78) and snippets 510-3 and 510-4 that are from different documents (Federalist Nos. 80 and 82, respectively) than snippets 510-1 and 510-2.

FIG. 5B also illustrates gesture 516 detected on touch-sensitive display 112. Gesture 516 includes movement of contacts 516-A and/or 516-B detected on display 112. That is, both contacts 516-A and 516-B are detected on touch-sensitive display 112, and movement is detected for either or both contacts. For example, both contacts 516-A and 516-B may be moving, or one contact moves and the other remains in place. In some embodiments, detecting movements of contacts 516-A and 516-B include detecting movements of the contacts relative to each other.

As depicted in FIG. 5B, contacts 516-A and 516-B are in proximity of and on opposite sides of snippet 510-2 (shown with a dotted line border for the sake of clarity), with contact 516-B overlapping snippet content 512 of snippet 510-2; contacts 516-A and 516-B (and thus, gesture 516) is associated with snippet 510-2. Contact 516-A is, between contacts 516-A and 516-B, closer to the upper side of snippet 510-2 and contact 516-B is, between the two contacts, closer to the lower portion of snippet 510-2. Contacts 516-A and 516-B are detected as moving in opposite directions 518-A and 518-B, respectively; gesture 516 is a depinch gesture. In response to detection of the movement of contacts 516-A and 516-B relative to each other, additional content is displayed around the original snippet content in snippet 510-2, as shown in FIG. 5C-5D.

Figure 5C:
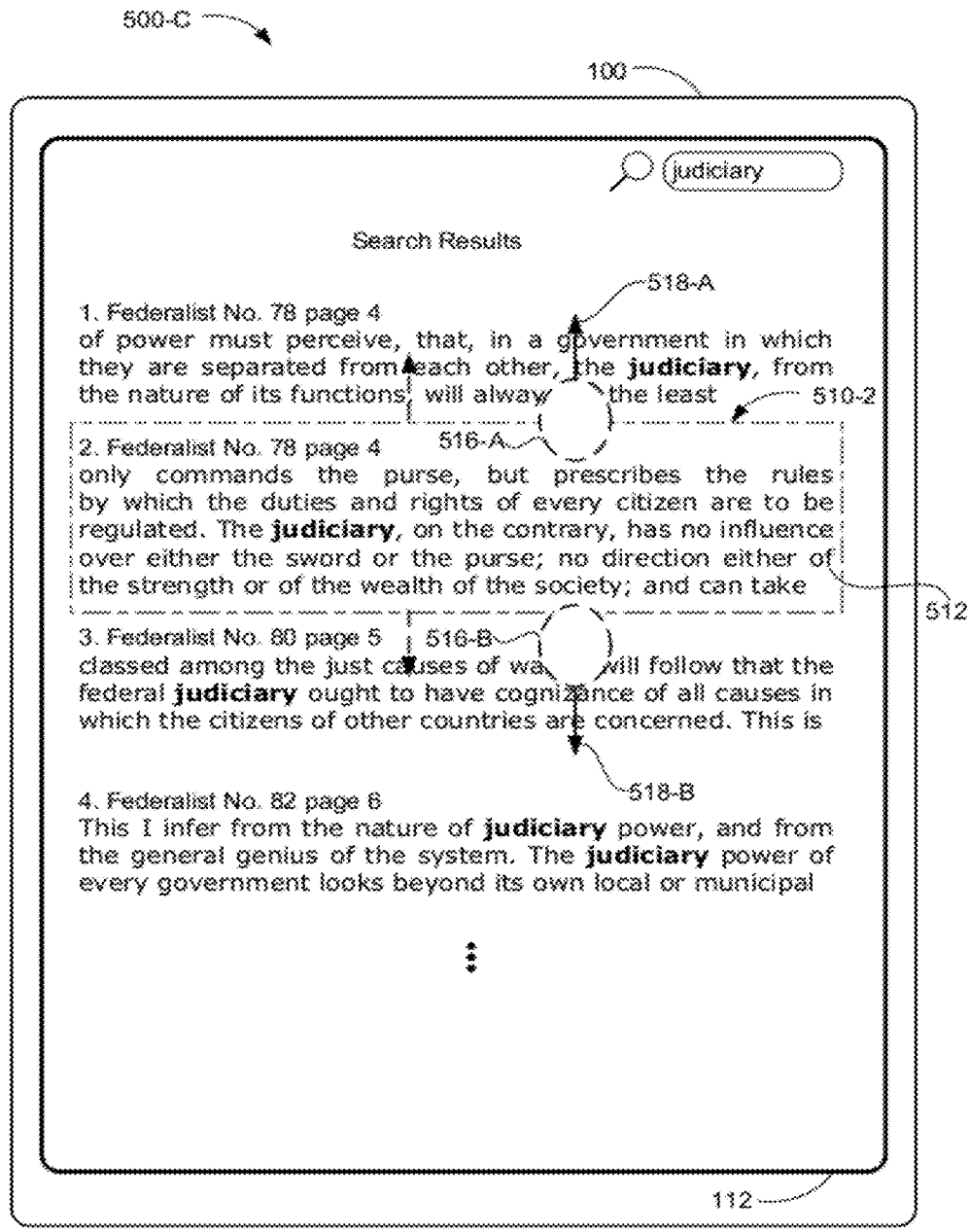
Figure 5D:
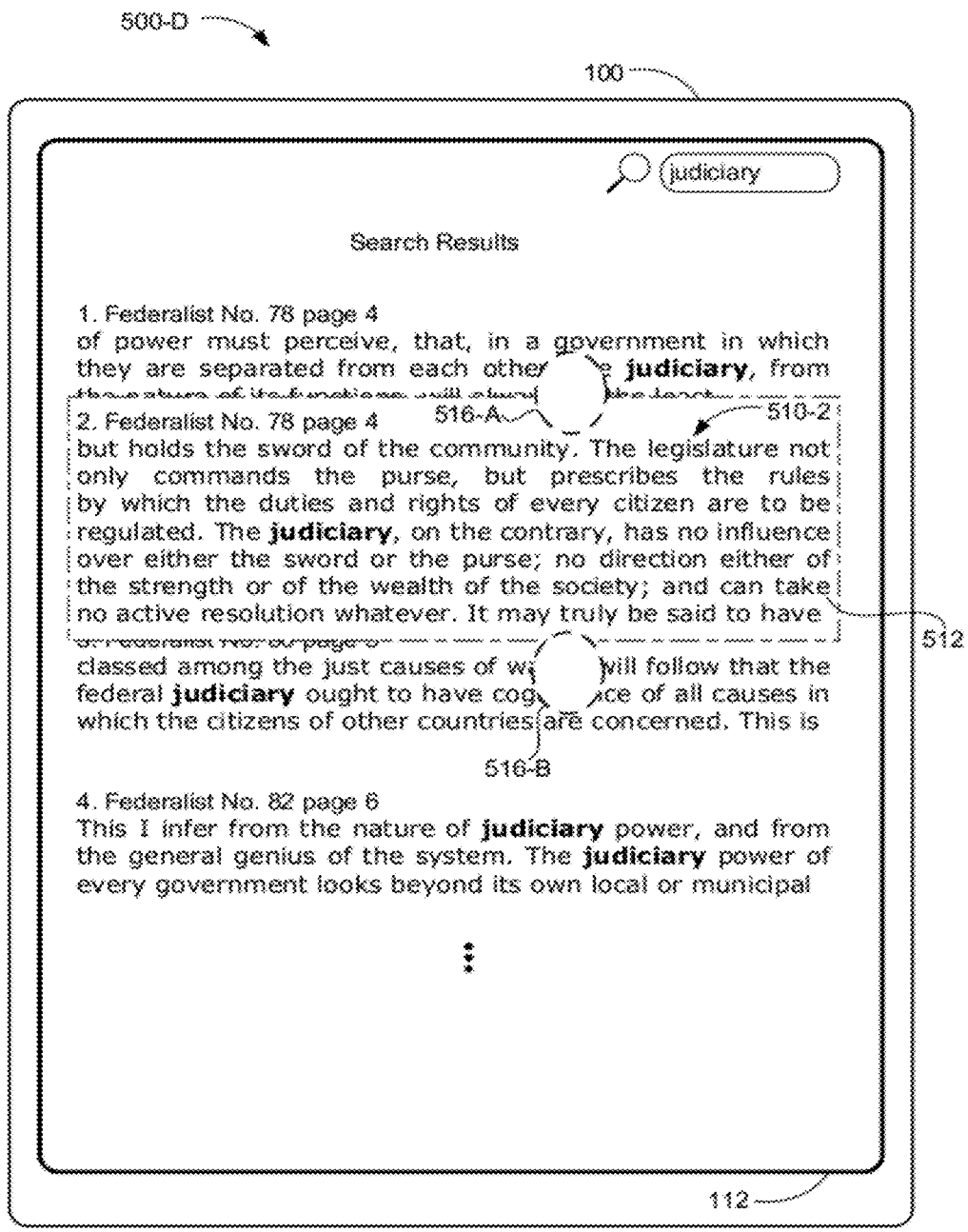

FIG. 5C includes UI 500-C, which includes additional content being added to snippet content 512 of snippet 510-2 in response to detection of movements of contacts 516-A and 516-B in directions 518-A and 518-B, respectively. In FIG. 5B, snippet content 512 of snippet 510-2 reads:

"by which the duties and rights of every citizen are to be regulated. The judiciary, on the contrary, has no influence over either the sword or the purse; no direction either of."

Whereas in FIG. 5C, snippet content 512 reads:

"only commands the purse, but prescribes the rules by which the duties and rights of every citizen are to be regulated. The judiciary, on the contrary, has no influence over either the sword or the purse; no direction either of the strength or of the wealth of the society; and can take."

Thus, in response to detection of movement of contacts 516-A and 516-B, prior additional content and subsequent additional content are added to the original snippet content of snippet 510-2, without adding content to the other snippets 510-1, 510-3, and 510-4. In some embodiments, the prior additional content is text, from the document from which snippet content 512 is taken, that occurs immediately prior to the original snippet content text in the document. In some embodiments, the subsequent additional content is text, also from the document from which snippet content 512 is taken, that occurs immediately subsequent to the original snippet content text in the document.

In some embodiments, the addition of additional content to snippet content 512 is in response to detection of movement of contact 516-A relative to contact 516-B, or vice versa. For example, in FIGS. 5B-5C, contact 516-A is moving relative to contact 516-B, and vice versa. In response to detection of the relative movement, additional content is added to snippet content 512 of snippet 510-2.

In some embodiments, the addition of content to snippet content 512 of snippet 510-2 is animated; content is added to snippet content as relative movement of contacts 516-A and/or 516-B is detected.

In some embodiments, adding the additional content to snippet content 512 of snippet 510-2 includes expanding snippet 510-2 vertically, as shown in FIG. 5C. In some embodiments, the zoom or magnification level of snippet content 512 remains the same as snippet 510-2 is expanded.

In some embodiments, snippet 510-2 remains at a fixed location on touch-sensitive display 112 as additional content is added to its snippet content 512. The additional content is added around the original snippet content 512, and snippet 510-2 expands upward and/or downward, as shown in FIGS. 5C-5D.

FIG. 5D includes UI 500-D. In FIG. 5D, the movement of contacts 516-A and 516-B on touch-sensitive display 112 has ceased. Snippet content 512 of snippet 510-2 now reads:

"but holds the sword of the community. The legislature not only commands the purse, but prescribes the rules by which the duties and rights of every citizen are to be regulated. The judiciary, on the contrary, has no influence over either the sword or the purse; no direction either of the strength or of the wealth of the society; and can take no active resolution whatever. It may truly be said to have."

Figure 5E:
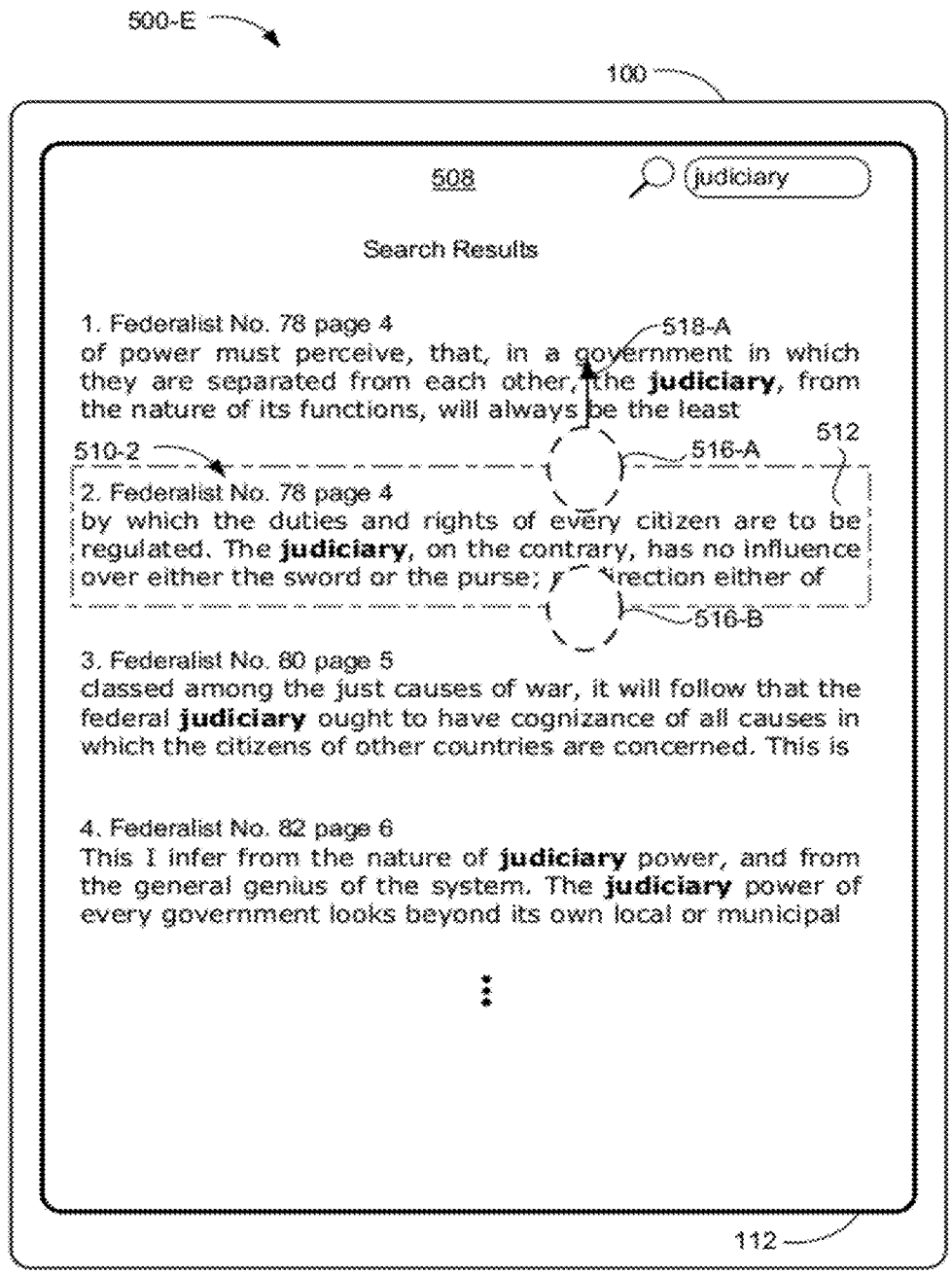
Figure 5F:
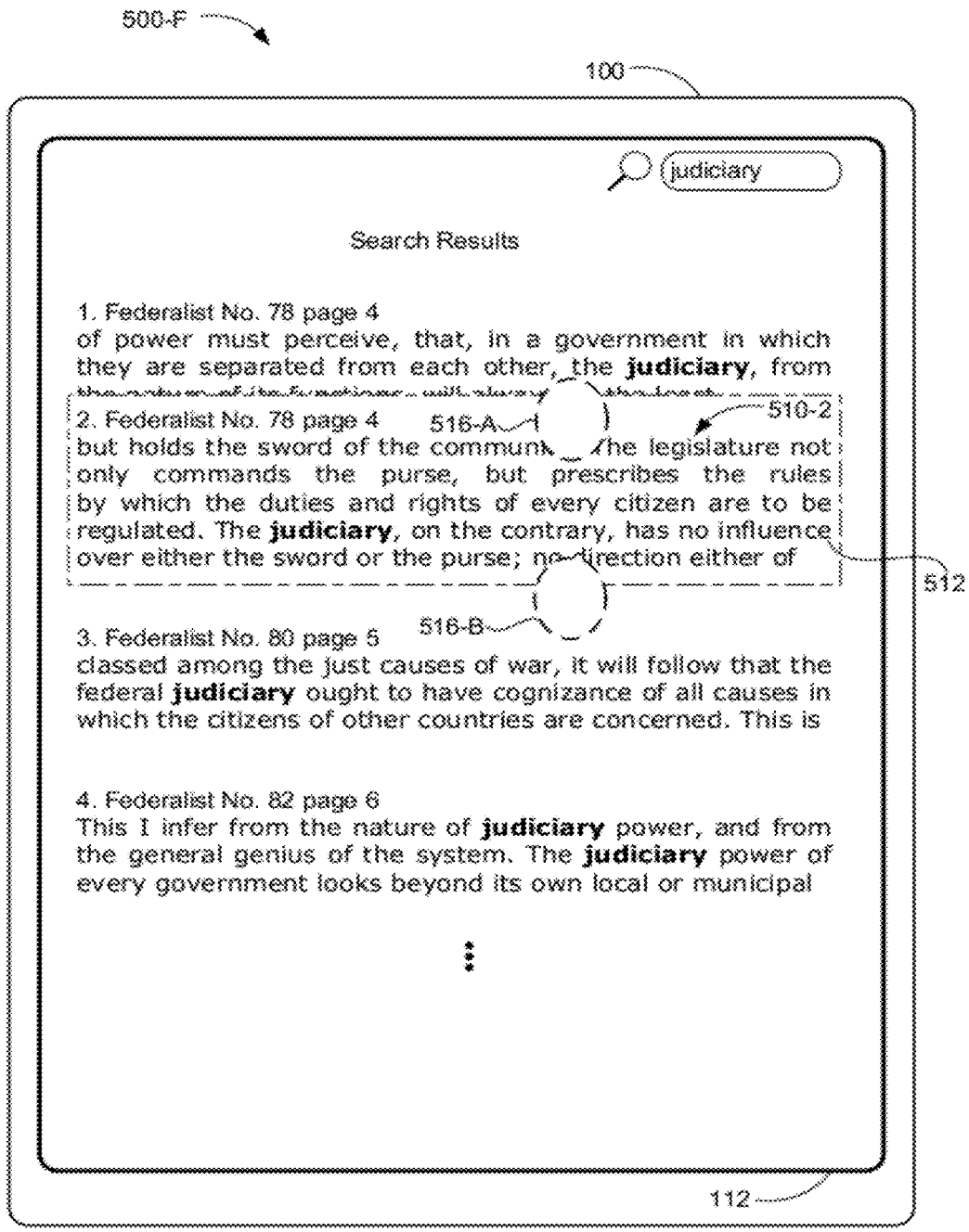

FIGS. 5E-5H illustrate examples of additional content being added to snippet content 512 of snippet 510-2 when one of contacts 516-A or 516-B is detected as moving and the other contact is detected as not moving. FIG. 5E includes UI 500-E, which includes contact 516-A detected as moving in direction 518-A, and contact 516-B detected as not moving (stationary). In response to detection of movement of contact 516-A relative to contact 516-B, additional content is added to snippet content 512 of snippet 510-2, as shown in FIG. 5F.

FIG. 5F includes UI 500-F, which includes snippet 510-2 with additional content added to its snippet content 512 in response to the movement of contact 516-A relative to contact 516-B, as illustrated in FIG. 5E. Because, contact 516-A moved while contact 516-B remained stationary in FIG. 5E, the additional content in FIG. 5F is just prior additional content for snippet content 512. Thus, while snippet content 512 in FIG. 5E reads the same as in FIG. 5B, in FIG. 5F snippet content 512 reads:

"but holds the sword of the community. The legislature not only commands the purse, but prescribes the rules by which the duties and rights of every citizen are to be regulated. The judiciary, on the contrary, has no influence over either the sword or the purse; no direction either of."

The text "but holds the sword of the community. The legislature not only commands the purse, but prescribes the rules" occurs in Federalist No. 78 immediately prior to the text "by which the duties and rights of every citizen are to be regulated. The judiciary, on the contrary, has no influence over either the sword or the purse; no direction either of."

Figure 5G:
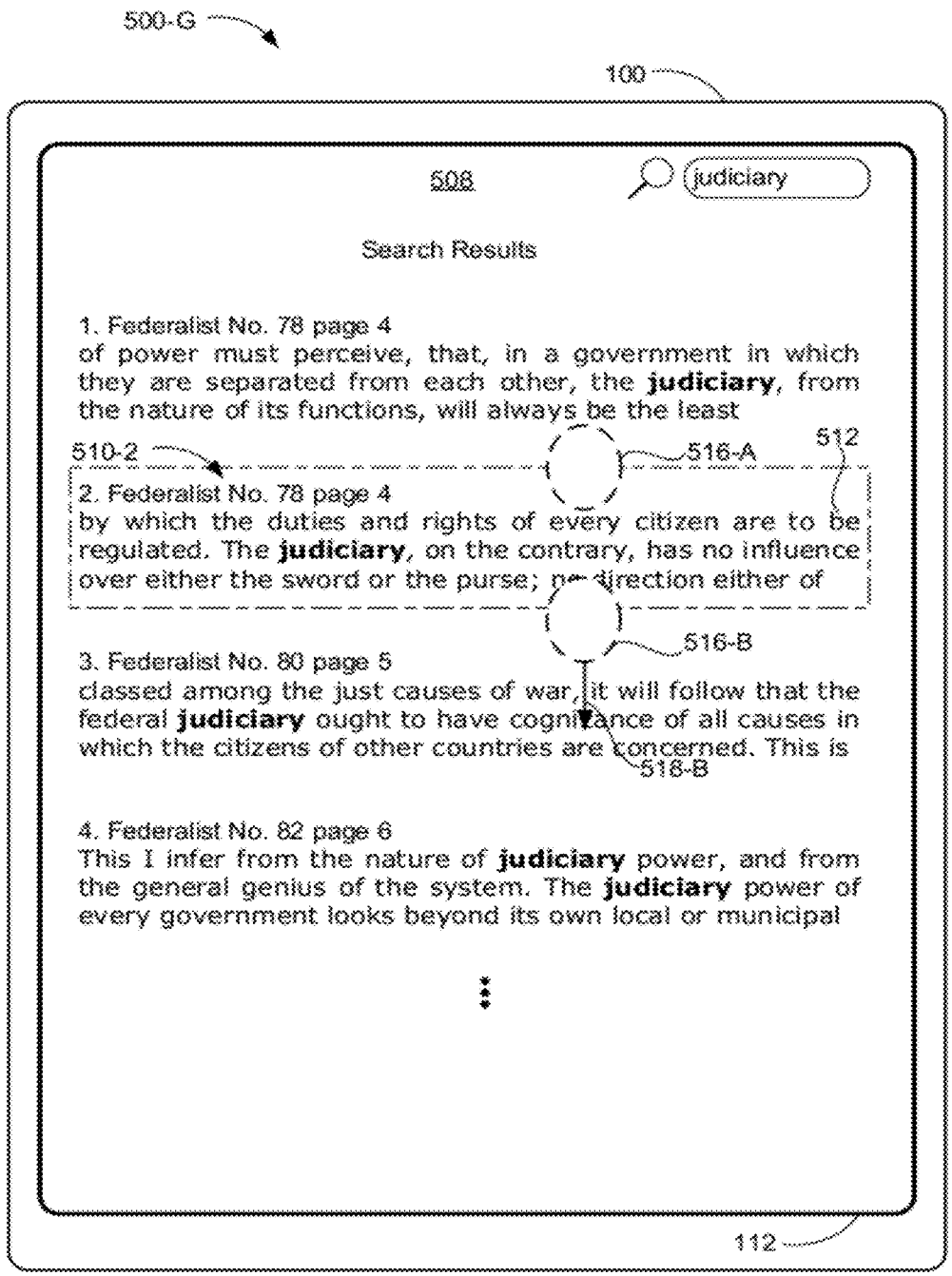

FIG. 5G includes UI 500-G, which includes contact 516-B detected as moving in direction 518-B, and contact 516-A detected as not moving (stationary). In response to detection of movement of contact 516-B relative to contact 516-A, additional content is added to snippet content 512 of snippet 510-2, as shown in FIG. 5H.

Figure 5H:
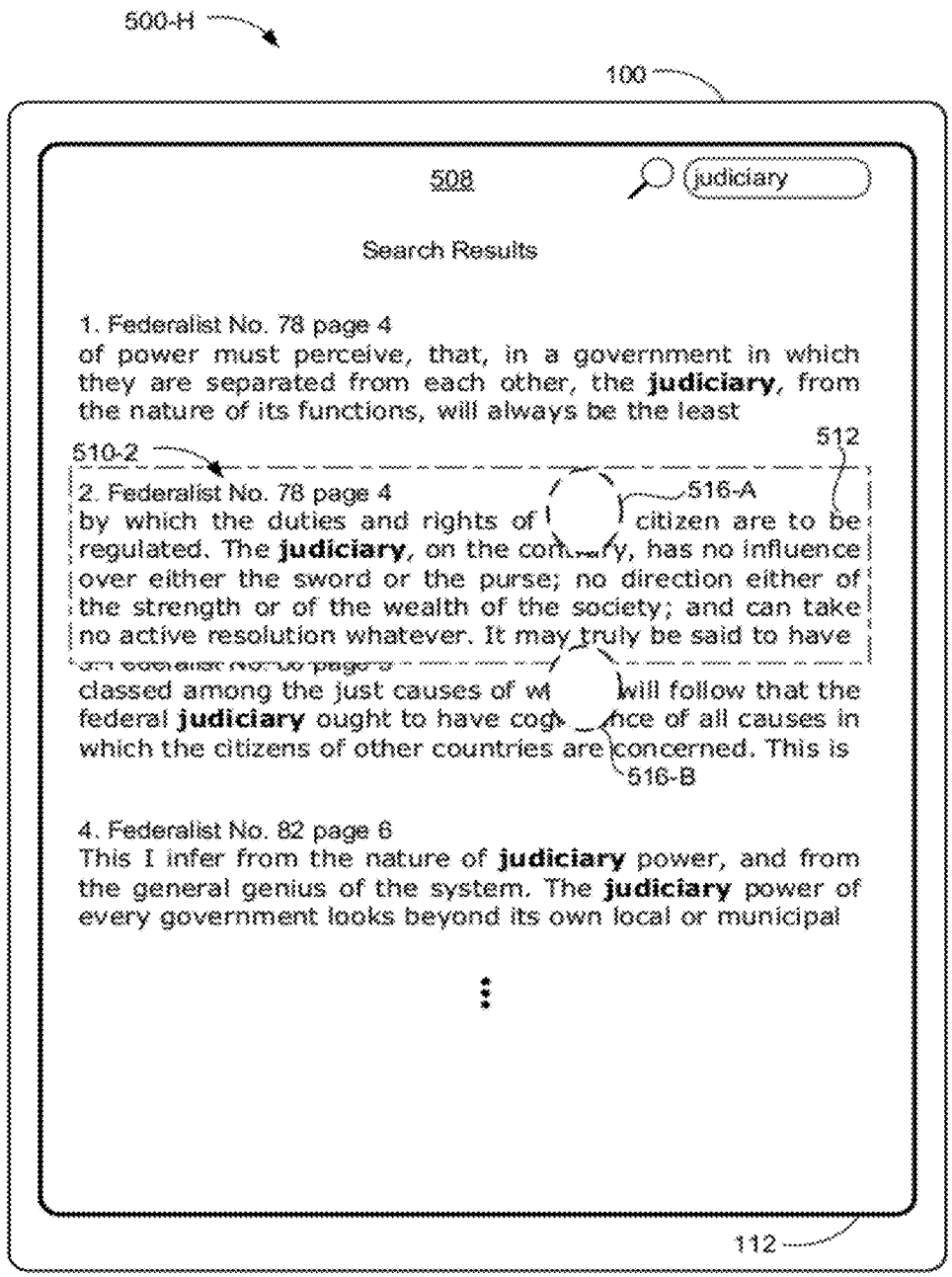

FIG. 5H includes UI 500-H, which includes snippet 510-2 with additional content added to its snippet content 512 in response to the movement of contact 516-B relative to contact 516-A, as illustrated in FIG. 5G. Because, contact 516-B moved while contact 516-A remained stationary in FIG. 5G, the additional content in FIG. 5H is just subsequent additional content for snippet content 512. Thus, while snippet content 512 in FIG. 5G reads the same as in FIG. 5B, in FIG. 5H snippet content 512 reads:

"by which the duties and rights of every citizen are to be regulated. The judiciary, on the contrary, has no influence over either the sword or the purse; no direction either of the strength or of the wealth of the society; and can take no active resolution whatever. It may truly be said to have."

The text "the strength or of the wealth of the society; and can take no active resolution whatever. It may truly be said to have" occurs in Federalist No. 78 immediately subsequent to the text "by which the duties and rights of every citizen are to be regulated. The judiciary, on the contrary, has no influence over either the sword or the purse; no direction either of."

Thus, in some embodiments, what content is added to snippet content 512 is based on the movements of contacts 516-A and 516-B. When contact 516-A, which is closer to the upper side of snippet 510-2, moves upward away from snippet 510-2, relative to contact 516-B, prior additional content is added. When contact 516-B, which is closer to the lower side of snippet 510-2, moves downward away from snippet 510-2 relative to contact 516-A, subsequent additional content is added. When contacts 516-A and 516-B both move away from snippet 510-2, as shown in FIGS. 5B-5C, prior additional content and subsequent additional content are added, as shown in FIGS. 5C-5D.

In some embodiments, the additional content is removed from snippet content 512 when the movements of contacts 516-A and 516-B depicted in FIGS. 5B-5C, 5E, or 5G are reversed, i.e. the two contacts moves toward each other, relatively speaking For example, referring to FIG. 5D, the prior and subsequent additional content are removed from snippet content 512 of snippet 510-2 if contacts 516-A and 516-B move toward each other, as in a pinch gesture. Referring to FIG. 5F, the prior additional content is removed if contact 516-A moves toward the snippet content 510-2 (i.e., toward contact 516-B). Referring to FIG. 5H, the subsequent additional content is removed if contact 516-B moves toward the snippet content 510-2 (i.e., toward contact 516-A). Thus, while contacts 516-A and 516-B are detected on touch-sensitive display 112, content may be added to snippet content 512 or subtracted from snippet content 512 (to revert back to the original snippet content) in accordance with the movement of contacts 516-A and 516-B.

Figure 5I:
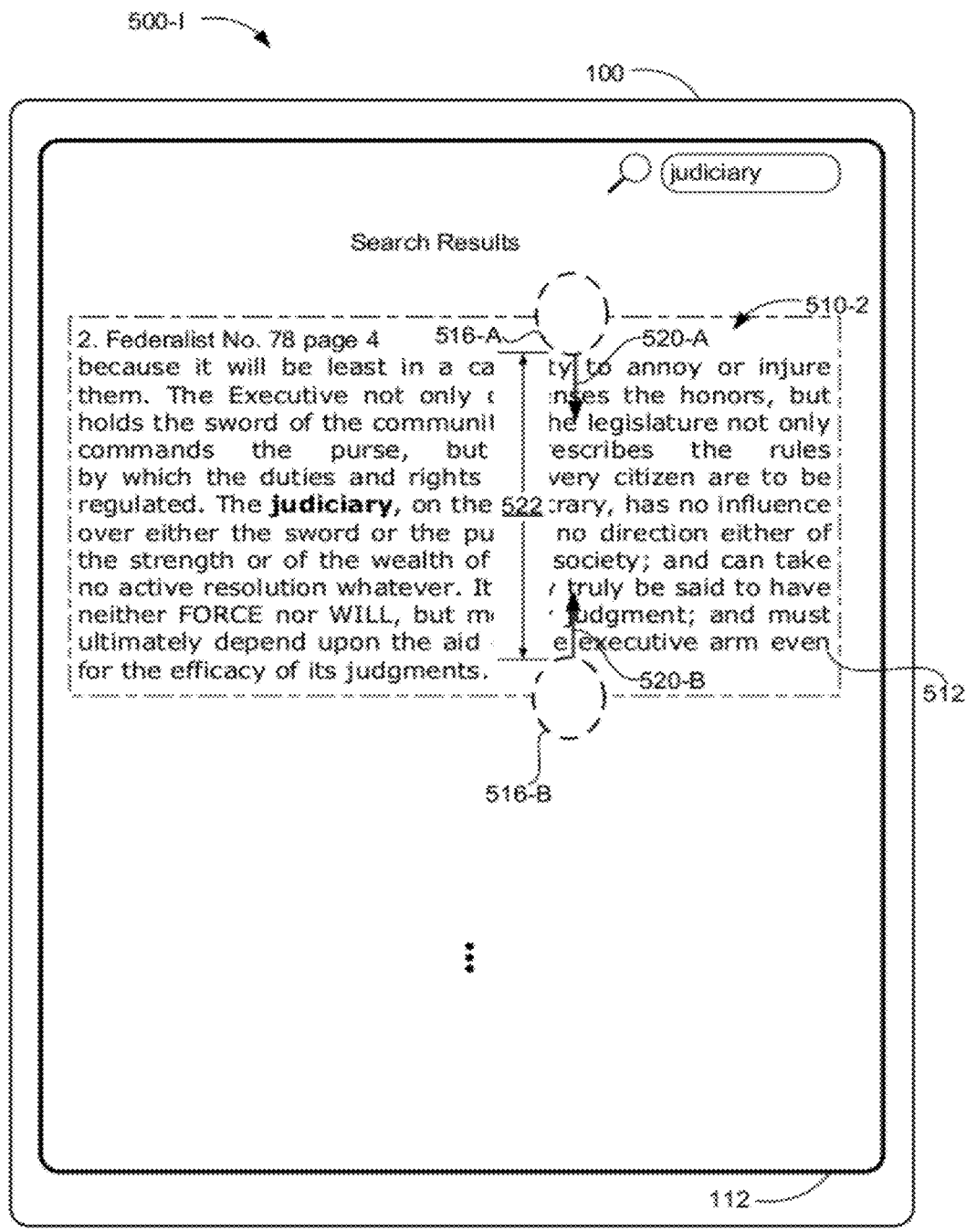

In some embodiments, while gesture 516 continues to be detected, a gesture metric based on gesture 516 may exceed a predefined fading threshold. In response to detection of the gesture metric exceeding the fading threshold, the snippets other than snippet 510-2 (i.e., snippets 510-1, 510-3, 510-4) cease to be displayed, as shown in FIG. 5I. UI 500-I in FIG. 5I includes snippet 510-2 being displayed with additional content added to its snippet content 512 and snippets 510-1, 510-3, 510-4 not displayed. In some embodiments, snippets 510-1, 510-3, and 510-4 fade away in response to the gesture metric exceeding the fading threshold.

In some embodiments, the gesture metric is a measure of distance between the contacts in the gesture (e.g., the distance between contacts 516-A and 516-B). For example, in FIG. 5I, the distance between contacts 516-A and 516-B exceeds fading threshold 522, and in response to the distance exceeding fading threshold 522, snippets 510-1, 510-3, and 510-4 fade away and cease to be displayed.

Figure 5J:
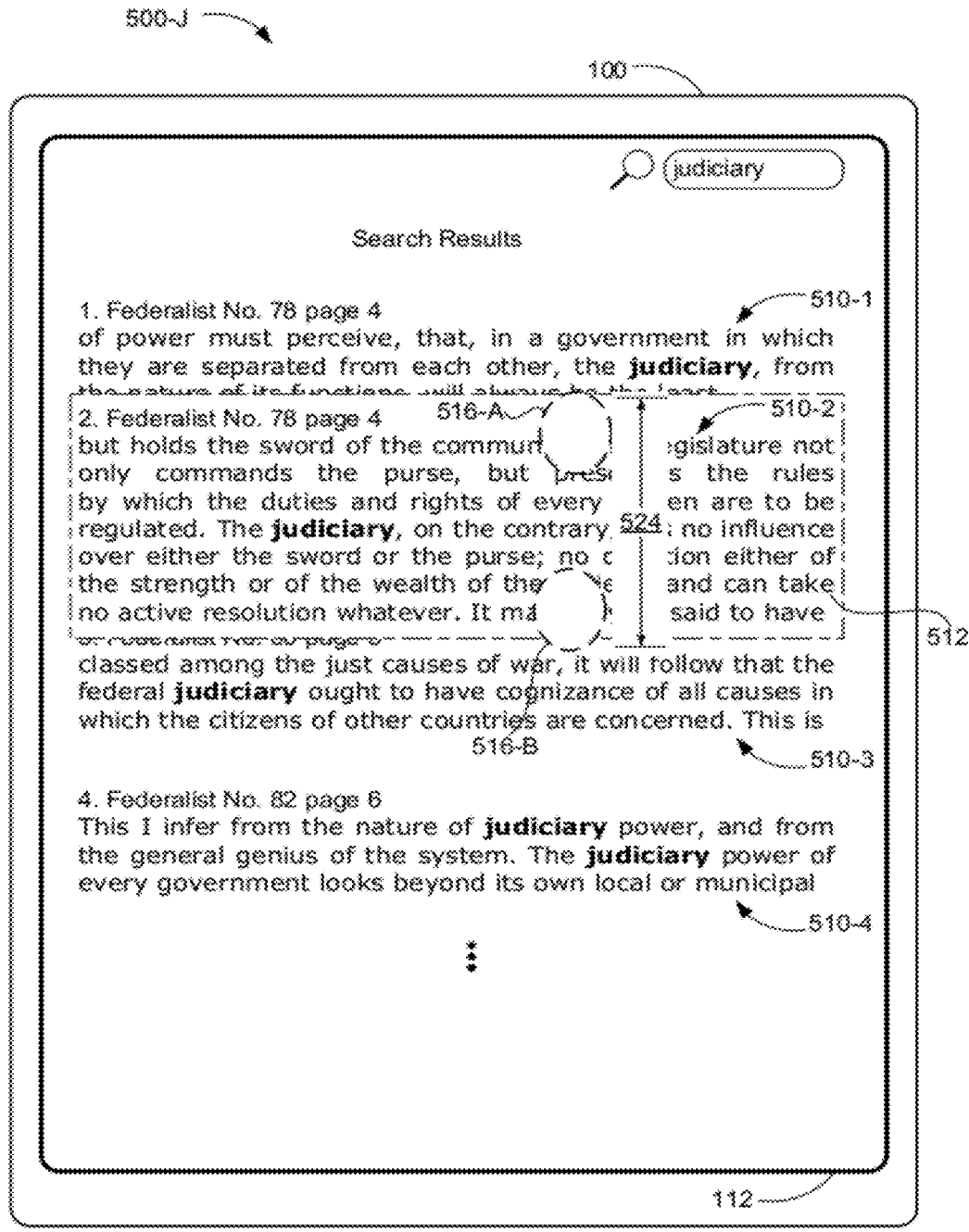

Continuing from FIG. 5I, while gesture 516 continues to be detected and snippets 510-1, 510-3, and 510-4 are not displayed, the gesture metric may go below a predefined redisplay threshold. In response to detection of the gesture metric going below the redisplay threshold, snippets 510-1, 510-3, 510-4 are re-displayed, as shown in FIG. 5J. UI 500-J in FIG. 5J includes snippet 510-2 being displayed with additional content added to its snippet content 512 and snippets 510-1, 510-3, 510-4 being displayed. In some embodiments, snippets 510-1, 510-3, and 510-4 fade into display in response to the gesture metric going below the redisplay threshold.

In some embodiments, the redisplay threshold is the same as the fading threshold. In some other embodiments, the redisplay threshold is a threshold that is lower than the fading threshold. For example, as shown in FIG. 5I, contacts 516-A and 516-B may move toward each other, in directions 520-A and 520-B, respectively. When the distance between contacts 516-A and 516-B is smaller than redisplay threshold 524 (FIG. 5J), snippets 510-1, 510-3, and 510-4 are re-displayed.

In some embodiments, gesture 516 ends when contacts 516-A and 516-B lift off from touch-sensitive display 112. When the end of gesture 516 is detected, an action is performed in response to detection of the end of gesture 516 based on whether a gesture metric for gesture 516 is above or below a predefined collapse threshold. In some embodiments, the gesture metric is a measure of the distance between contacts between 516-A and 516-B just prior to detection of the end of gesture 516. In some other embodiments, the gesture metric is a measure of a change in distance between contacts 516-A and 516-B during gesture 516. In some further embodiments, the gesture metric includes a measure of velocity of either or both contacts 516-A and 516-B prior to detection of liftoff of the contacts.

If the gesture metric is a measure of distance (and thus the collapse threshold is a distance value), in some embodiments the collapse threshold is the same as fade threshold 522. In some other embodiments, the collapse threshold is the same as redisplay threshold 524. In some further embodiments, the collapse threshold is a different value from fade threshold 522 and from redisplay threshold 524.

Figure 5K:
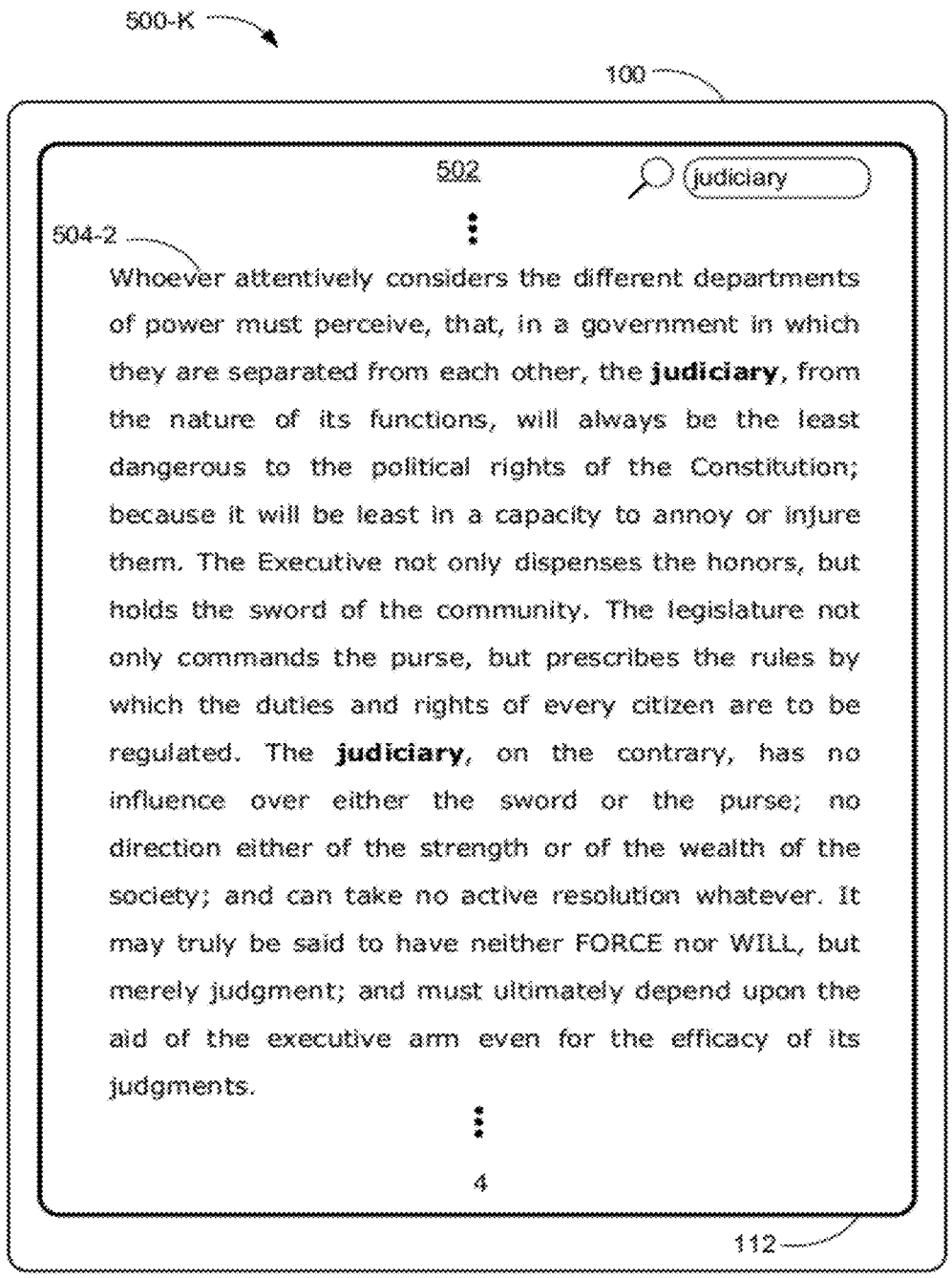

When the end of gesture 516 is detected and the gesture metric is above the collapse threshold, the portion of the document from which snippet 510-2 is taken is displayed, replacing display of the set of search results with snippets 510. For example, if in FIG. 5J, the collapse threshold is the same as redisplay threshold 524 and contacts 516-A and 516-B lift off from their positions as shown, the portion of document 502 with snippet content 512 from snippet 510-2 is displayed on touch-sensitive display 112, as shown in FIG. 5K. FIG. 5K depicts UI 500-K, which includes electronic document 502 with text 504-2 being displayed. Text 504-2 that is displayed is a portion of document 502 that includes snippet content 512 of snippet 510-2. In some embodiments, instances of the query term are highlighted (e.g., "judiciary" in boldface, as shown in FIG. 5K). In some embodiments, the text of the snippet is highlighted.

When the end of gesture 516 is detected and the gesture metric is below the collapse threshold, the additional content added to snippet content 512 of snippet 510-2 is removed and snippet 510-2 reverts back to its original state, as shown in FIG. 5B; snippet 510-2 "collapses" back to its original state and the search results, including other snippets, are redisplayed.

Figure 5L:
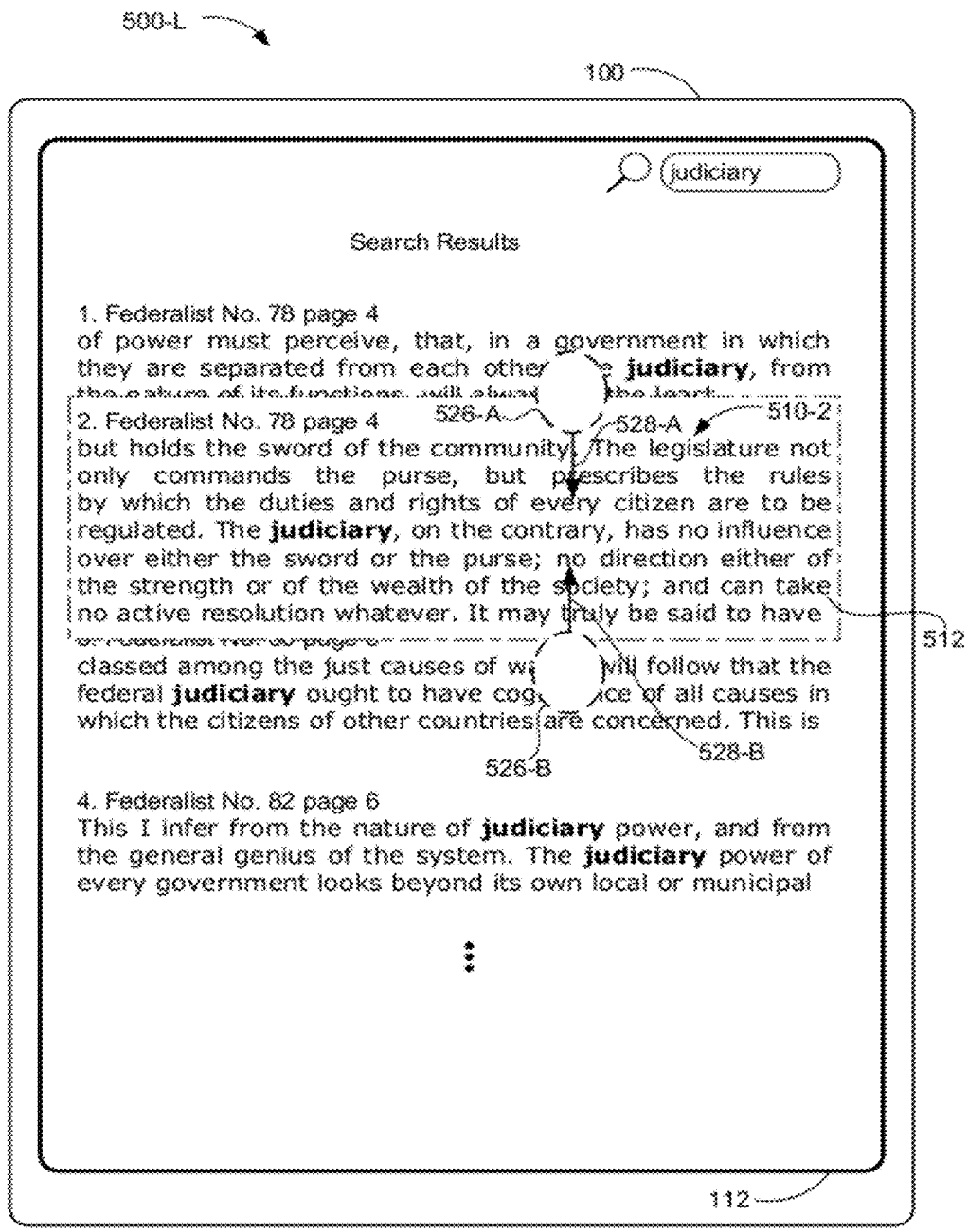

In some other embodiments, when the end of gesture 516 is detected, neither is the document portion that includes the snippet displayed in response, nor is the additional content removed from snippet content 512 in response. Instead, additional content remains displayed in snippet 510-2, an example of which is shown in FIG. 5L. FIG. 5L depicts UI 500-L, which includes snippet 510-2 with snippet content 512 that still includes additional content after the end of gesture 516 is detected. After the end of gesture 516, gesture 526 is detected on touch-sensitive display 112. Gesture 526 includes contacts 526-A and 526-2, moving in directions 528-A and 528-B, respectively. In response to detection of gesture 526, snippet 510-2 collapses back to its original state.

Figure 5M:
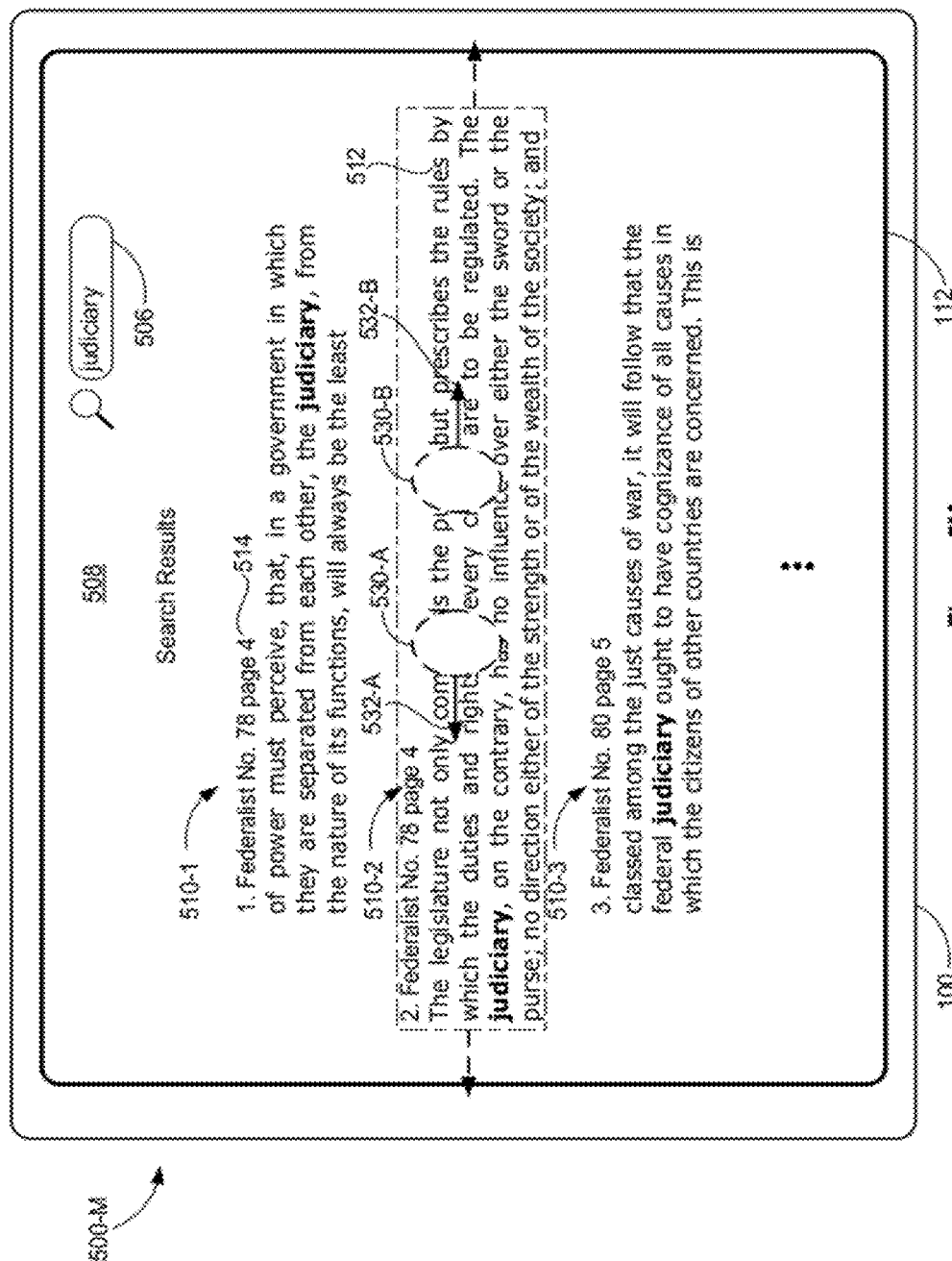
Figure 6A:
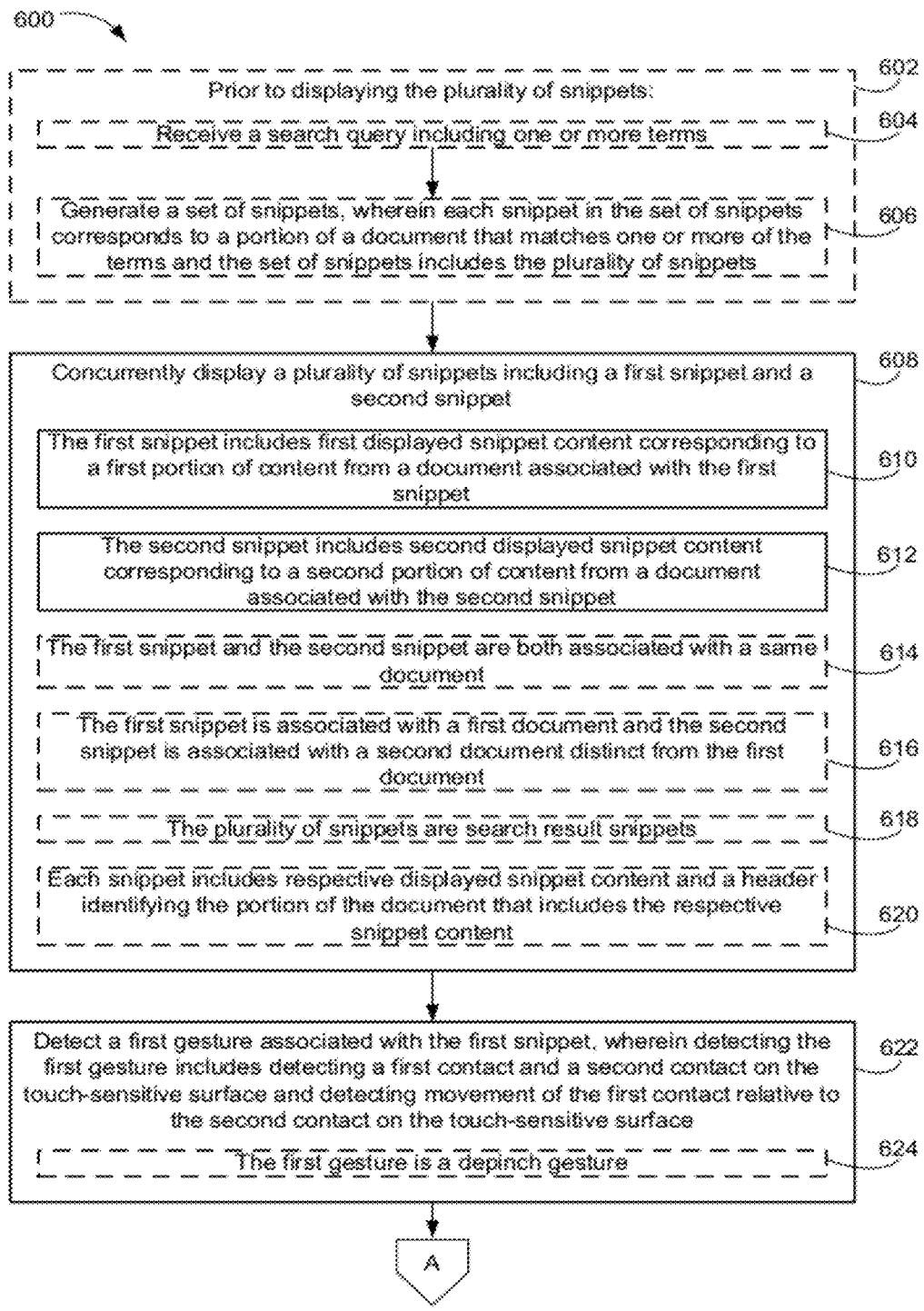
FIGS. 6A-6D are flow diagrams illustrating a method of using snippets to select content in accordance with some embodiments.
Figure 6B:
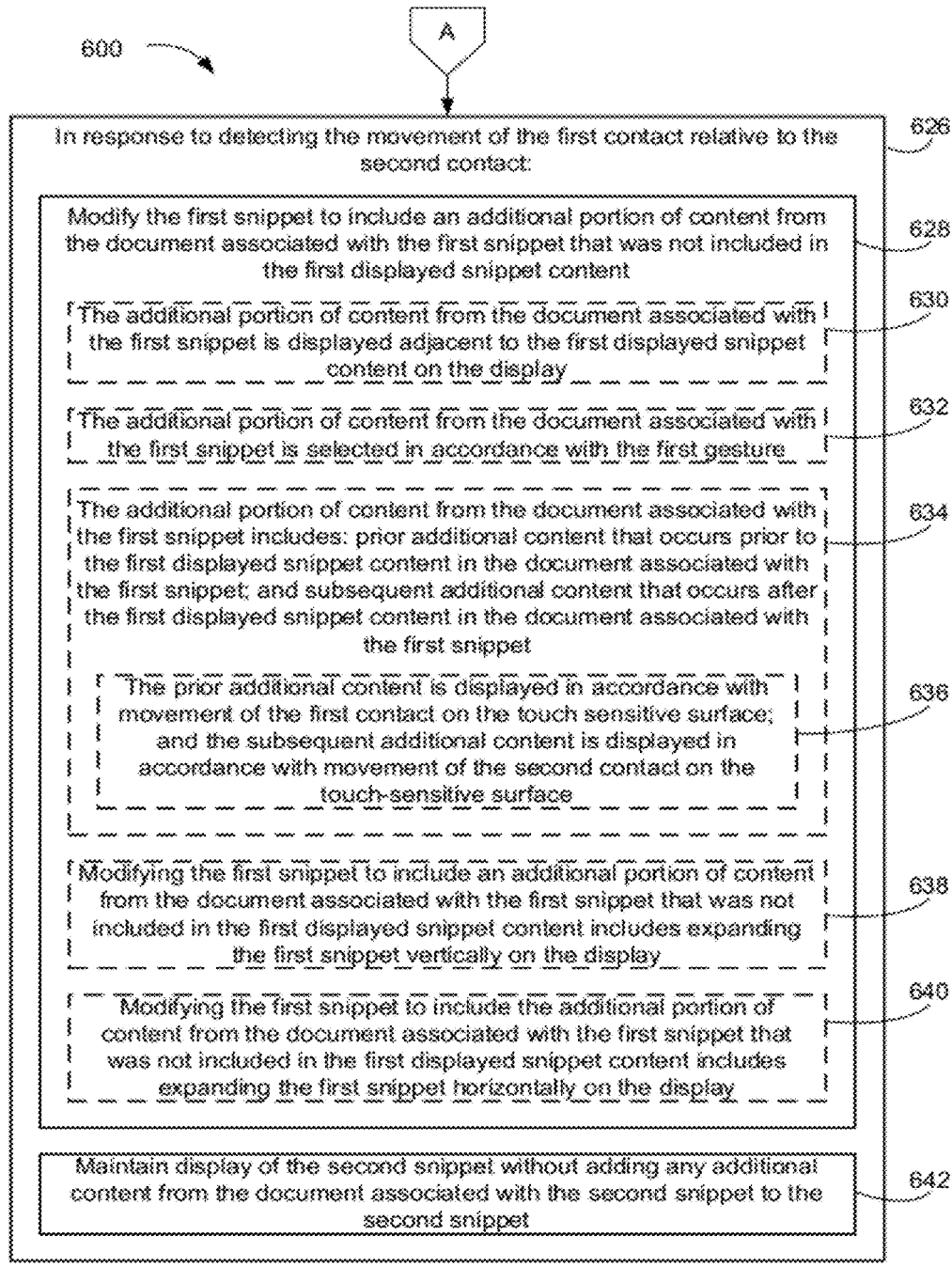
Figure 6C:
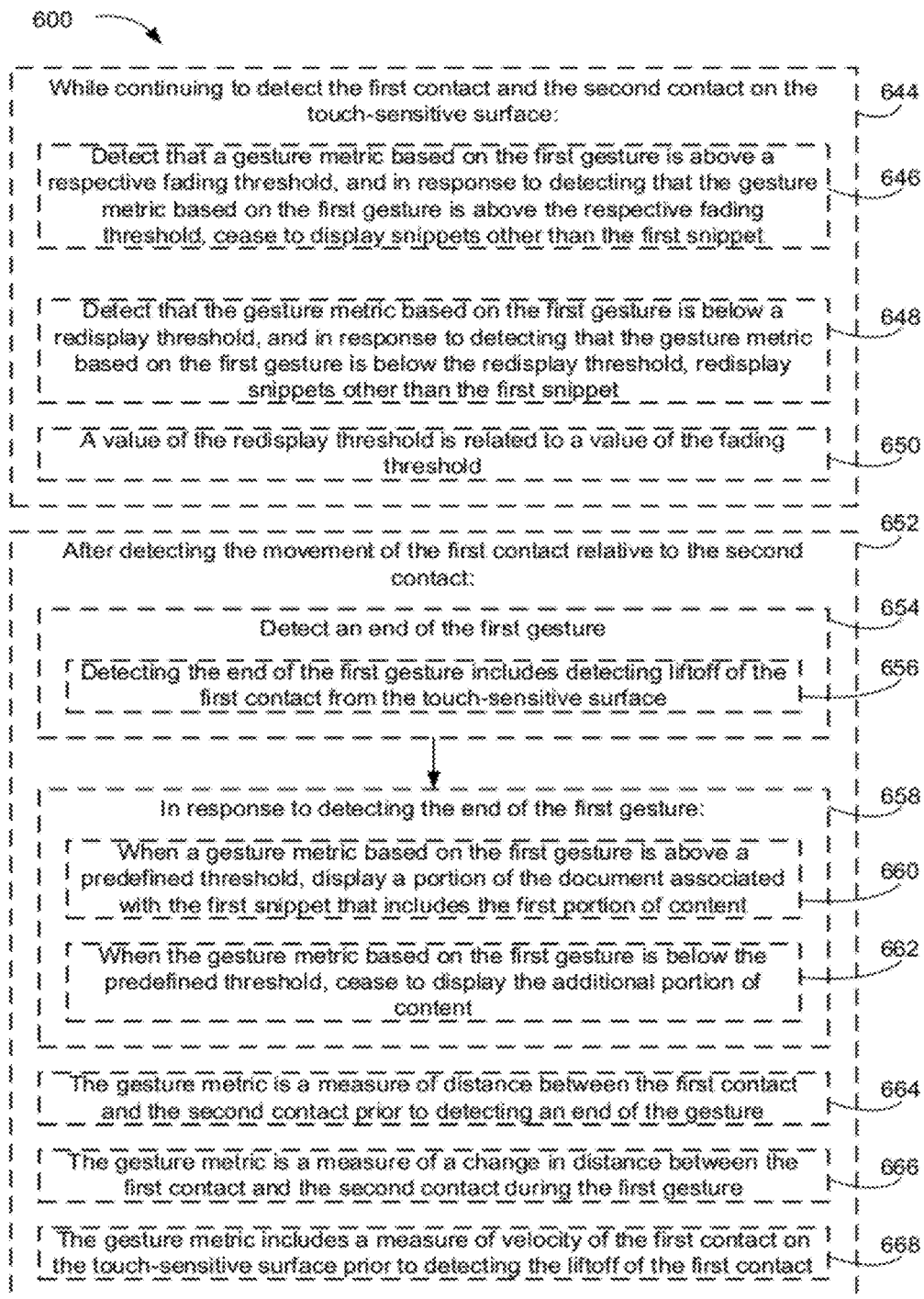
Figure 6D:
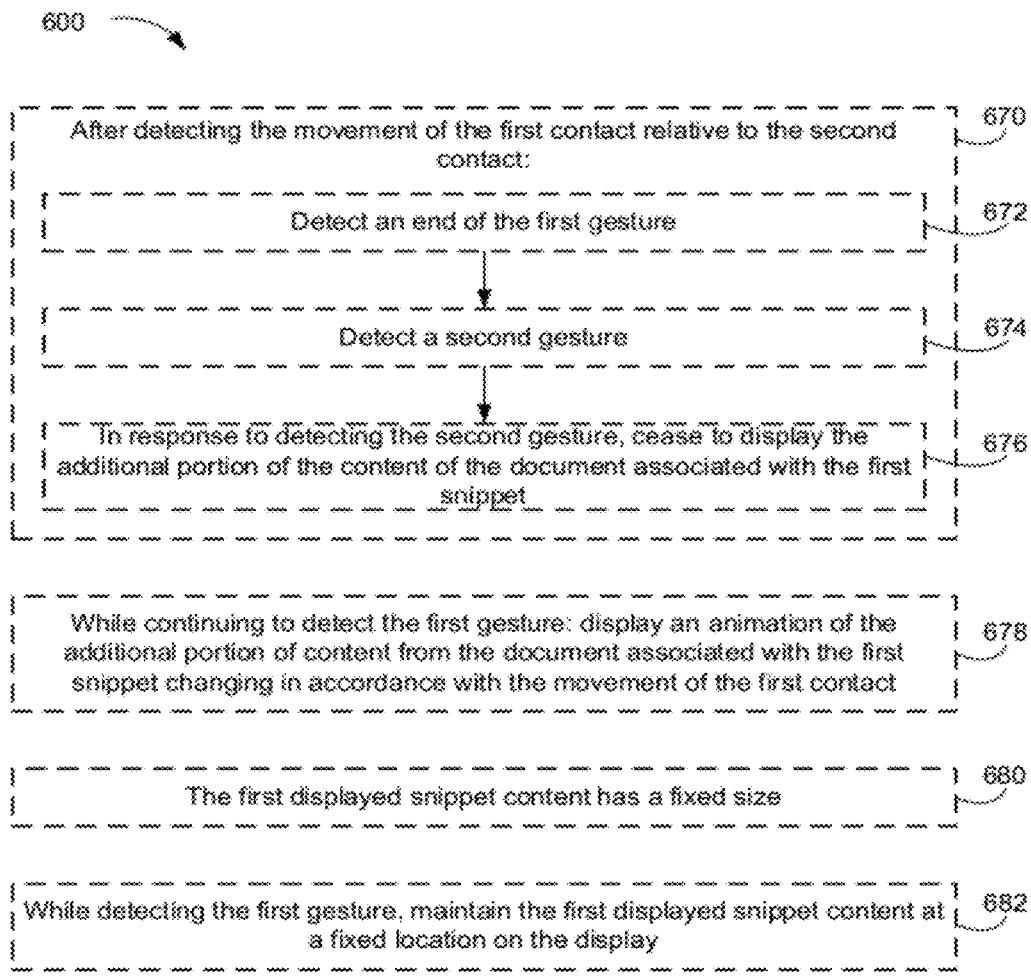

In some embodiments, adding additional content to snippet content 512 of snippet 510-2 includes expanding snippet 510-2 horizontally, an example of which is shown in FIG. 5M. FIG. 5M depicts UI 500-M, which includes gesture 530 detected in proximity of snippet 510-2. Gesture 530 includes contacts 530-A and 530-B moving in directions 532-A and 532-B, respectively. In response to detection of gesture 530, additional content is added to snippet content 512 of snippet 510-2, and snippet 510-2 expands horizontally to accommodate the additional content.

FIGS. 6A-6D are flow diagrams illustrating a method 600 of using snippets to select content (e.g., a search result) in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to select and view content corresponding to a particular snippet by displaying additional snippet content for the particular snippet. The method reduces the cognitive burden on a user when using snippets to decide which content to view, thereby creating a more efficient human-machine interface. For battery-operated electronic devices, enabling a user to decide which content to view faster and more efficiently conserves power and increases the time between battery charges.

The device concurrently displays a plurality of snippets including a first snippet and a second snippet (608). The first snippet includes first displayed snippet content corresponding to a first portion of content from a document associated with the first snippet (610), and the second snippet includes second displayed snippet content corresponding to a second portion of content from a document associated with the second snippet (612). Multiple snippets are displayed on a display of a device (e.g., touch-sensitive display 112 of device 100). A snippet in the multiple snippets is associated with a respective document and includes respective snippet content corresponding to a portion of content from the associated document. For example, as shown in FIG. 5B, multiple snippets 510 are displayed on touch-sensitive display 112. Each of these snippets is associated with a respective document (a respective article from the Federalist Papers) and includes text taken from the respective associated document.

In some embodiments, the first snippet and the second snippet are both associated with a same document (614) (e.g., the first snippet and the second snippets are search snippets that include content from different portions of the same document that both match a search query). For example, snippets 510-1 and 510-2 (FIG. 5B) are both associated with the same document (Federalist No. 78). In some embodiments, adjacent snippets from the same document are displayed with simulated "torn edges" to indicate that they are from the same document.

In some embodiments, the first snippet is associated with a first document and the second snippet is associated with a second document distinct from the first document (616) (e.g., the first snippet and second snippet are search snippets that include portions of content from different documents that both match a same search query). For example, snippets 510-2 and 510-3 are associated with different documents (snippet 510-2 with Federalist No. 78, snippet 510-3 with Federalist No. 80).

In some embodiments, the plurality of snippets are search result snippets (618). For example, snippets 510 in FIG. 5B are search results snippets displayed in response to a search query with the query term "judiciary."

In some embodiments, the search result snippets are prioritized in accordance with predefined criteria and are displayed on the display in accordance with the determined prioritization. For example, the search result snippets may be prioritized in accordance with characteristics of query terms of the search query within the document (e.g., section heading terms>bold terms>caption terms>other terms). In other words, when search terms appear in emphasized text (e.g., text that is bold or in larger type or as part of a heading), the snippets including those search terms appear higher in the search results than they otherwise would. In some embodiments, context is still taken into account, so that the rank of a snippet in a search query is based on a combination of the context of the search result and any emphasis on terms in the search result.

In some embodiments, prior to displaying the plurality of snippets (602), the device receives a search query including one or more terms (604), and generates a set of snippets, where each snippet in the set of snippets corresponds to a portion of a document that matches one or more of the terms and the set of snippets includes the plurality of snippets (606). For example, device 100 receives a query with one or more search terms (e.g., query with term "judiciary" in search field 506, FIG. 5A) and a set of search result snippets (e.g., snippets 510) corresponding to document portions that match the term "judiciary" are generated (FIG. 5B).

In some embodiments, each snippet includes respective displayed snippet content and a header identifying the portion of the document that includes the respective snippet content (620). For example, a snippet 510-2 (FIG. 5B) includes snippet content 512 (e.g., text) and header 514 identifying the document and the portion of the document (e.g., by page number) that includes what is displayed as snippet content 512.

The device detects a first gesture associated with the first snippet, where detecting the first gesture includes detecting a first contact and a second contact on the touch-sensitive surface and detecting movement of the first contact relative to the second contact on the touch-sensitive surface (622). In some embodiments where the touch-sensitive surface is a touch screen display, the first gesture starts at a location that corresponds to at least a portion of the snippet (e.g., one or both of the contacts are initially detected within the snippet). It should be understood that movement of the first contact relative to the second contact can include movement of either the first contact, the second contact, or both the first contact and the second contact.

For example, FIG. 5B shows gesture 516 detected on touch-sensitive display 112. Gesture 516 includes contacts 516-A and 516-B detected in proximity of snippet 510-2 and thus associated with snippet 510-2, with contacts 516-A and 516-B overlapping snippet 510-2. Contacts 516-A and 516-B are detected as moving in directions 518-A and 518-B, respectively.

In some embodiments, the first gesture is a depinch gesture (624). For example, gesture 516 (FIG. 5B) with contacts 516-A and 516-2 moving in directions 518-A and 518-B, respectively, is a depinch gesture motion.

In response to detecting the movement of the first contact relative to the second contact (626), the device modifies the first snippet to include an additional portion of content from the document associated with the first snippet that was not included in the first displayed snippet content (628). It should be understood that the additional portion of content is content from the first document that is not included in the first portion of content. For example, in FIG. 5C, in response to detection of gesture 516, snippet content 512 of snippet 510-2 is modified to include additional text from Federalist No. 78 that was not in the original snippet content 512.

Also in response to detecting the movement of the first contact relative to the second contact (626), the device maintains display of the second snippet without adding any additional content from the document associated with the second snippet to the second snippet (642). In other words, the appearance of the second snippet is maintained, although the second snippet may be translated on the display. Additionally, in some embodiments, the appearance of the second snippet is adjusted in conjunction with adjustments to other user interface elements displayed on the display (e.g., if all of the snippets other than the first snippet are faded as additional content is added to the first snippet, the second snippet will also be faded). For example, in FIG. 5C, as snippet content 512 of snippet 510-2 is modified, the other snippets 510-1, 510-3, and 510-4 remain displayed as they are.

In some embodiments, the additional portion of content from the document associated with the first snippet is displayed adjacent to the first displayed snippet content on the display (630). For example, in FIGS. 5C-5D, the additional text added to snippet content 512 of snippet 510-2 are displayed adjacent (above and/or below) the original snippet content 512 ("by which the duties and rights . . . no direction either of").

In some embodiments, the additional portion of content from the document associated with the first snippet is selected in accordance with the first gesture (e.g., as a distance between the first and second contacts increases, the additional portion includes a larger portion of the content of the document). In some embodiments, the amount of content included in the additional portion of content depends on the amount of distance between the first contact and the second contact along a predefined axis of the user interface (e.g., an axis that is perpendicular to the primary reading direction of the snippet content). For example, the amount of content in the additional content may be determined in accordance with a vertical distance (or an increase in vertical distance) between the first and second contacts on the touch-sensitive surface.

For example, in FIG. 5C, one line of additional text is added above original snippet content 512 in snippet 510-2 when contact 516-A move by a certain amount. In FIG. 5D, after contact 516-A moves by an additional amount, a second line of additional text is added above original snippet content 512 in snippet 510-2.

In some embodiments, the additional portion of content from the document associated with the first snippet includes prior additional content that occurs prior to the first displayed snippet content in the document associated with the first snippet (e.g., one or more lines of text that occur immediately prior to the text in the first displayed snippet content in the source document from which the first snippet was retrieved), and subsequent additional content that occurs after the first displayed snippet content in the document associated with the first snippet. (e.g., one or more lines of text that occur immediately after the text in the first displayed snippet content in the source document from which the first snippet was retrieved) (634). For example, in FIG. 5D, the text "but holds the sword of the community. The legislature not only commands the purse, but prescribes the rules" occurs in Federalist No 78 immediately before the original snippet content text "by which the duties and rights . . . no direction either of," and the text "the strength or of the wealth of the society; and can take no active resolution whatever. It may truly be said to have" occurs in Federalist No. 78 immediately after the original snippet content text.

In some embodiments, the prior additional content is displayed in accordance with movement of the first contact on the touch sensitive surface (e.g., the first contact is located at a region on the touch-sensitive surface that corresponds to a region on the display that is above or to the left of the first snippet on the touch sensitive surface), and the subsequent additional content is displayed in accordance with movement of the second contact on the touch-sensitive surface (e.g., the second contact is located at a region on the touch-sensitive surface that corresponds to a region on the display that is below or to the right of the first snippet on the touch sensitive surface) (636). In other words, if the first and second contacts are above and below the first snippet respectively, and the depinch gesture is asymmetric such that the contact that is above the first snippet moves more than the contact below the first snippet, then more content of the document from which the snippet was retrieved that occurs prior to the snippet will be displayed to the user.

For example, in FIGS. 5E-5F, contact 516-A, which is above snippet 510-2, is detected as moving in direction 518-A, but contact 516-B remains in place. In response, an additional line of text is added above original snippet content 512. The additional line of text occurs in Federalist No. 78 prior to the original snippet content text. Conversely, in FIGS. 5G-5H, contact 516-B, which is below snippet 510-2, is detected as moving in direction 518-B, but contact 516-A remains in place. In response, an additional line of text is added below original snippet content 512. The additional line of text occurs in Federalist No. 78 subsequent to the original snippet content text.

In some embodiments, modifying the first snippet to include an additional portion of content from the document associated with the first snippet that was not included in the first displayed snippet content includes expanding the first snippet vertically on the display (638). For example, FIG. 5C-5D shows snippet 510-2 expanded vertically to accommodate the additional lines of text.

In some embodiments, modifying the first snippet to include the additional portion of content from the document associated with the first snippet that was not included in the first displayed snippet content includes expanding the first snippet horizontally on the display (640). For example, FIG. 5M shows snippet 510-2 expanded horizontally to accommodate the additional lines of text.

In some embodiments, while continuing to detect the first contact and the second contact on the touch-sensitive surface (644), the device detects that a gesture metric based on the first gesture is above a respective fading threshold, and in response to detecting that the gesture metric based on the first gesture is above the respective fading threshold, the device ceases to display snippets other than the first snippet (646). For example, in FIG. 5I, where the gesture metric is a distance between contact 516-A and 516-B, when the distance between the two contacts is detected to be greater than fading threshold 522, snippets 510-1, 510-3, and 510-4 cease to be displayed. In some embodiments, while continuing to detect the first contact and the second contact on the touch-sensitive surface, the device detects that the gesture metric based on the first gesture is below a redisplay threshold, and in response to detecting that the gesture metric based on the first gesture is below the redisplay threshold, the device redisplays snippets other than the first snippet (648). For example, in FIG. 5J, when the distance between the two contacts is below redisplay threshold 524, snippets 510-1, 510-3, and 510-4 are displayed again.

In some embodiments, a value of the redisplay threshold is related to a value of the fading threshold (650) (e.g., the redisplay threshold is the fading threshold or there is a gap between the fading and redisplay threshold to provide a form of hysterisis, and avoid jitter at the fading threshold). For example, redisplay threshold 524 may be the same as fading threshold 522. Alternatively, as in FIGS. 5I-5J, redisplay threshold 524 is shorter than fading threshold 522 (i.e., there is a gap between the two).

In some embodiments, after detecting the movement of the first contact relative to the second contact (652), the device detects an end of the first gesture (654) (e.g., liftoff of one or both of the contacts). In response to detecting the end of the first gesture (658), when a gesture metric based on the first gesture is above a predefined threshold, the device displays a portion of the document associated with the first snippet that includes the first portion of content (660). In some embodiments, if the end of the first gesture is detected when the gesture metric is above the predefined threshold, the device ceases to display the other snippets and enters a document viewing mode (e.g., a full screen viewing mode). In the document viewing mode, a portion of the document that includes the first snippet is displayed and the document is available for the user to navigate through.

When the gesture metric based on the first gesture is below the predefined threshold, the device ceases to display the additional portion of content (662). In some embodiments, if the end of the first gesture is detected when the gesture metric is below the predefined threshold, the device redisplays the plurality of snippets as they were previously displayed (e.g., returning to the search results as previously displayed before detecting the first gesture). For example, in FIG. 5J, if contacts 516-A and 516-B lift off at the positions shown, thus ending gesture 516; the gesture metric is the distance between the two contacts; and the threshold is threshold 524 (i.e., the distance between contacts 516-1 and 516-2 is below threshold 524), then the additional lines of text in snippet content 512 of snippet 510-2 are removed and snippets 510-1, 510-3, and 510-4 are displayed again (i.e., reverting back to the state shown in FIG. 5B).

In some embodiments, the gesture metric (e.g., resizing metric) is a measure of distance between the first contact and the second contact prior to detecting an end of the gesture (664). For example, the resizing metric may be the distance between contacts 516-A and 516-B, which is also the gesture metric for fading and re-displaying purposes.

In some embodiments, the gesture metric (e.g., resizing metric) is a measure of a change in distance between the first contact and the second contact during the first gesture (666) (e.g., when the initial distance between the first contact and the second contact was 1 inch and the current distance between the first contact and the second contact is 2 inches, the change in distance between the first contact and the second contact during the first gesture is 1 inch or 100%.). For example, the resizing metric for resizing purposes may be the change in distance between contacts 516-A and 516-B or the relative/percent change in distance.

In some embodiments, detecting the end of the first gesture includes detecting liftoff of the first contact (and/or second contact) from the touch-sensitive surface (656), and the gesture metric (e.g., gesture speed metric) includes a measure of velocity of the first contact (and/or second contact) on the touch-sensitive surface prior to detecting the liftoff of the first contact (and/or second contact) (668). In some embodiments, the measure of velocity is a measure of the velocity of the first contact relative to the touch-sensitive surface. In some embodiments, the measure of velocity is a measure of velocity of the first contact relative to the second contact. For example, the gesture speed metric may include a measure of contact 516-A movement speed and/or 516-B movement speed prior to liftoff of contacts 516-A and 516-B.

In some embodiments, after detecting the movement of the first contact relative to the second contact (670), the device detects an end of the first gesture (672) (e.g., liftoff of one or both of the contacts) and detects a second gesture (674) (e.g., after detecting the end of the first gesture and while continuing to display the additional portion of the content of the document associated with the first snippet). In response to detecting the second gesture, the device ceases to display the additional portion of the content of the document associated with the first snippet (676) (e.g., redisplaying the originally displayed plurality of snippets). For example, in FIG. 5L, after contacts 516-A and 516-B lift off, gesture 526 is detected while snippet 510-2 with snippet content 512 that includes additional content is displayed. In response to detection of pinching gesture 526, the additional content in snippet content 512 is removed and snippet 510-2 reverts back to its original state, as shown in FIG. 5B.

In some embodiments, while continuing to detect the first gesture, the device displays an animation of the additional portion of content from the document associated with the first snippet changing in accordance with the movement of the first contact (678). For example, when the first contact moves further away from the second contact (e.g., as contacts 516-A and 516-B move away from each other, FIG. 5C), the additional content includes a greater number of lines of content (as shown in FIGS. 5C-5D), and when the first contact moves closer to the second contact, the additional content includes a smaller number of lines of content.

In some embodiments, the first displayed snippet content has a fixed size (680). In other words, the first snippet has a fixed zoom/magnification level (e.g., even when additional content is displayed in the first snippet, the first snippet is not zoomed). In some embodiments, the font size of the displayed snippet content is maintained during the depinch gesture. The first displayed snippet content and the additional portion of content that is displayed in the first snippet typically have a same font size. Thus, instead of merely enlarging the displayed snippet content (e.g., by increasing a zoom/magnification level), additional portions of the document associated with the first displayed snippet content are displayed in the first snippet. Consequently, in response to a depinch gesture, the user is able to view more of the content in the document that is proximate to the snippet, thereby allowing the user to view additional content from the document that provides helpful context to understand the first displayed snippet content.

For example, in FIGS. 5C-5D, when additional content is added to snippet content 512, snippet 510-2 remains at the same zoom/magnification level (e.g., same font size).

In some embodiments, while detecting the first gesture, the device maintains the first displayed snippet content at a fixed location on the display (682). In other words, the additional content is displayed around the originally displayed snippet content. This reduces the amount of visual jitter, providing a smooth transition from displaying the snippet with only the first displayed snippet content to displaying the first snippet with the first displayed snippet content and the additional portion of content from the document associated with the first snippet. In some embodiments, the first displayed snippet content is maintained at a fixed location on the display when the other snippets cease to be displayed (e.g., when the relevant page of the document is displayed to the user), so that the user can readily identify the first displayed snippet content in the relevant portion of the document.

For example, in FIGS. 5C-5D, the additional content (the additional lines of text) are added around the original snippet content 512, while the original snippet content 512 remains at the same location on touch-sensitive display 112.

Figure 7:
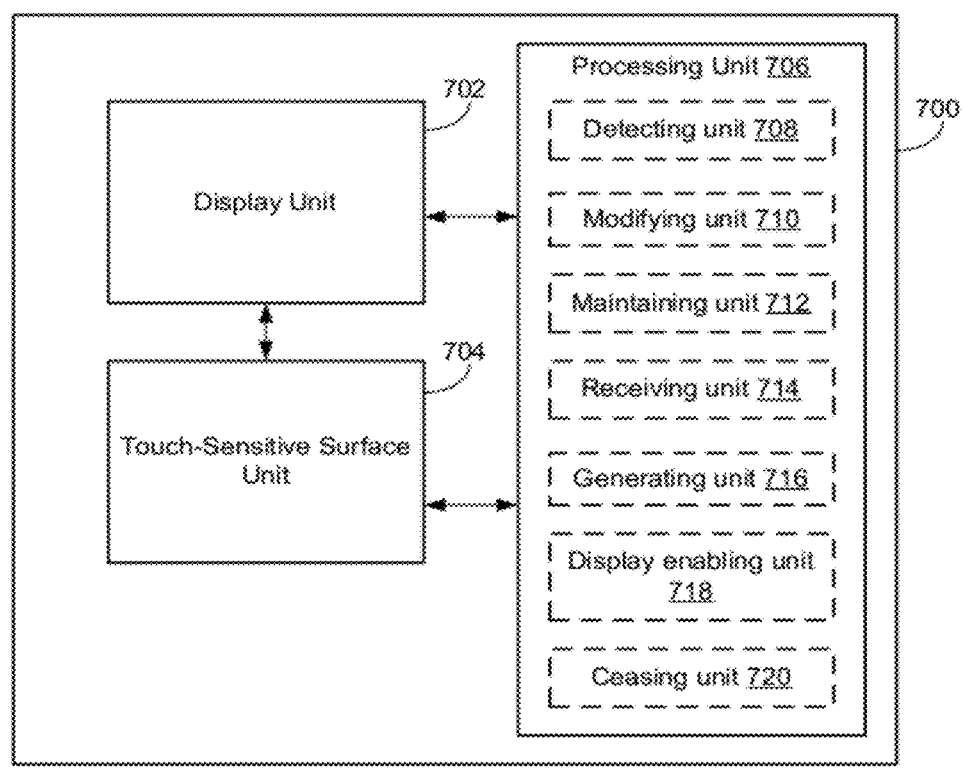
FIG. 7 is a functional block diagram of an electronic device in accordance with some embodiments.

In accordance with some embodiments, FIG. 7 shows a functional block diagram of an electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, an electronic device 700 includes a display unit 702 configured to concurrently display a plurality of snippets including a first snippet and a second snippet, where: the first snippet includes first displayed snippet content corresponding to a first portion of content from a document associated with the first snippet; and the second snippet includes second displayed snippet content corresponding to a second portion of content from a document associated with the second snippet; a touch-sensitive surface unit 704 configured to receive user gestures; and a processing unit 706 coupled to the display unit 702 and the touch-sensitive surface unit 704. In some embodiments, the processing unit 706 includes a detecting unit 708, a modifying unit 710, a maintaining unit 712, a receiving unit 714, a generating unit 716, a display enabling unit 718, and a ceasing unit 720.

The processing unit 706 is configured to: detect a first gesture associated with the first snippet (e.g., with the detecting unit 708), wherein detecting the first gesture includes detecting a first contact and a second contact on the touch-sensitive surface unit 704 and detecting movement of the first contact relative to the second contact on the touch-sensitive surface unit 704; and in response to detecting the movement of the first contact relative to the second contact: modify the first snippet to include an additional portion of content from the document associated with the first snippet that was not included in the first displayed snippet content (e.g., with the modifying unit 710); and maintain display of the second snippet without adding any additional content from the document associated with the second snippet to the second snippet (e.g., with the maintaining unit 712).

In some embodiments, the first snippet and the second snippet are both associated with a same document.

In some embodiments, the first snippet is associated with a first document and the second snippet is associated with a second document distinct from the first document.

In some embodiments, the plurality of snippets are search result snippets.

In some embodiments, the processing unit 706 is configured to: receive a search query including one or more terms (e.g., with the receiving unit 714); and generate a set of snippets (e.g., with the generating unit 716), wherein each snippet in the set of snippets corresponds to a portion of a document that matches one or more of the terms and the set of snippets includes the plurality of snippets.

In some embodiments, each snippet includes respective displayed snippet content and a header identifying the portion of the document that includes the respective snippet content.

In some embodiments, the additional portion of content from the document associated with the first snippet is displayed adjacent to the first displayed snippet content on the display unit 702.

In some embodiments, the additional portion of content from the document associated with the first snippet is selected in accordance with the first gesture.

In some embodiments, the additional portion of content from the document associated with the first snippet includes: prior additional content that occurs prior to the first displayed snippet content in the document associated with the first snippet; and subsequent additional content that occurs after the first displayed snippet content in the document associated with the first snippet.

In some embodiments, the prior additional content is displayed in accordance with movement of the first contact on the touch sensitive surface unit; and the subsequent additional content is displayed in accordance with movement of the second contact on the touch-sensitive surface unit 704.

In some embodiments, the first gesture is a depinch gesture.

In some embodiments, the processing unit 706 is configured to, while continuing to detect the first contact and the second contact on the touch-sensitive surface unit 704: detect that a gesture metric based on the first gesture is above a respective fading threshold (e.g., with the detecting unit 708), and in response to detecting that the gesture metric based on the first gesture is above the respective fading threshold, cease to display snippets other than the first snippet (e.g., with the ceasing unit 720); and detect that the gesture metric based on the first gesture is below a redisplay threshold (e.g., with the detecting unit 708), and in response to detecting that the gesture metric based on the first gesture is below the redisplay threshold, re-enable display of snippets other than the first snippet (e.g., with the display enabling unit 718).

In some embodiments, a value of the redisplay threshold is related to a value of the fading threshold.

In some embodiments, the processing unit 706 is configured to, after detecting the movement of the first contact relative to the second contact: detect an end of the first gesture (e.g., with the detecting unit 708); and in response to detecting the end of the first gesture: when a gesture metric based on the first gesture is above a predefined threshold, enable display of a portion of the document associated with the first snippet that includes the first portion of content (e.g., with the display enabling unit 718); and when the gesture metric based on the first gesture is below the predefined threshold, cease to display the additional portion of content (e.g., with the ceasing unit 720).

In some embodiments, the gesture metric is a measure of distance between the first contact and the second contact prior to detecting an end of the gesture.

In some embodiments, the gesture metric is a measure of a change in distance between the first contact and the second contact during the first gesture.

In some embodiments, detecting the end of the first gesture includes detecting liftoff of the first contact from the touch-sensitive surface unit 704; and the gesture metric includes a measure of velocity of the first contact on the touch-sensitive surface unit 704 prior to detecting the liftoff of the first contact.

In some embodiments, the processing unit 706 is configured to, after detecting the movement of the first contact relative to the second contact: detect an end of the first gesture (e.g., with the detecting unit 708); detect a second gesture (e.g., with the detecting unit 708); and in response to detecting the second gesture, cease to display the additional portion of the content of the document associated with the first snippet (e.g., with the ceasing unit 720).

In some embodiments, modifying the first snippet to include an additional portion of content from the document associated with the first snippet that was not included in the first displayed snippet content includes expanding the first snippet vertically on the display unit 702.

In some embodiments, modifying the first snippet to include the additional portion of content from the document associated with the first snippet that was not included in the first displayed snippet content includes expanding the first snippet horizontally on the display unit 702.

In some embodiments, the processing unit 706 is configured to, while continuing to detect the first gesture: enable display of an animation of the additional portion of content from the document associated with the first snippet changing in accordance with the movement of the first contact (e.g., with the display enabling unit 718).

In some embodiments, the first displayed snippet content has a fixed size.

In some embodiments, the processing unit 706 is configured to, while detecting the first gesture, maintain the first displayed snippet content at a fixed location on the display unit 702 (e.g., with the maintaining unit 712).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6D may be implemented by components depicted in FIGS. 1A-1B. For example, detection operation 622, modifying operation 628, and maintaining operation 642 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Although the method has been illustrated above using search result snippets to help select and view content corresponding to a particular search result, it should be understood that the method is also applicable to concurrent displays of other types of snippets of information so that a user can more efficiently select and view content corresponding to a particular snippet. For example, the method is applicable to a concurrent display of snippets from different electronic books or articles. The snippets may be displayed as samples of the content in each book or article (e.g., to promote the different electronic books or articles), rather than being displayed as the result of a search by the user. Detecting a multitouch gesture on a particular snippet causes additional content for that particular snippet to be displayed, without displaying additional content for the other snippets. Thus, a user can choose a book or article faster and more efficiently, without having to go back and forth between viewing a page with the snippets and viewing a page of content corresponding to just one snippet.

What is claimed is:

1. An electronic device, comprising:
   a display and a touch-sensitive surface;
   one or more processors;
   memory; and
   one or more programs, wherein the one or more programs are stored in the memory and configured to be executed by the one or more processors, the one or more programs including instructions for:
   concurrently displaying a plurality of snippets of text including a first snippet of text and a second snippet of text, wherein:
      the first snippet of text includes first displayed snippet text corresponding to a first portion of text from a document associated with the first snippet of text; and
      the second snippet of text includes second displayed snippet text corresponding to a second portion of text from a document associated with the second snippet of text;
   detecting a first gesture associated with the first snippet of text, wherein detecting the first gesture includes detecting a first contact and a second contact on the touch-sensitive surface and detecting movement of the first contact relative to the second contact on the touch-sensitive surface; and
   in response to detecting the movement of the first contact relative to the second contact:
      modifying the first snippet of text to include an additional portion of text from the document associated with the first snippet of text that was not included in the first displayed snippet text, wherein the additional portion of text from the document associated with the first snippet of text includes:
         additional text that occurs prior to the first displayed snippet text in the document associated with the first snippet of text; and
         additional text that occurs after the first displayed snippet text in the document associated with the first snippet of text; and
      maintaining display of the second snippet of text without adding any additional text from the document associated with the second snippet of text to the second snippet of text.

2. The device of claim 1, wherein the additional portion of text from the document associated with the first snippet of text is displayed adjacent to the first displayed snippet text on the display.

3. The device of claim 1, wherein the additional portion of text from the document associated with the first snippet of text is selected in accordance with the first gesture.

4. The device of claim 1, wherein:
   the additional text that occurs prior to the first displayed snippet text is displayed in accordance with movement of the first contact on the touch sensitive surface; and
   the additional text that occurs after the first displayed snippet text is displayed in accordance with movement of the second contact on the touch-sensitive surface.

5. The device of claim 1, including instructions for, while continuing to detect the first contact and the second contact on the touch-sensitive surface:
   detecting that a gesture metric based on the first gesture is above a respective fading threshold, and in response to detecting that the gesture metric based on the first gesture is above the respective fading threshold, ceasing to display snippets of text other than the first snippet of text; and detecting that the gesture metric based on the first gesture is below a redisplay threshold, and in response to detecting that the gesture metric based on the first gesture is below the redisplay threshold, redisplaying snippets of text other than the first snippet of text.

6. The device of claim 5, wherein a value of the redisplay threshold is related to a value of the fading threshold.

7. The device of claim 1, including instructions for, after detecting the movement of the first contact relative to the second contact:

detecting an end of the first gesture; and in response to detecting the end of the first gesture:
when a gesture metric based on the first gesture is above a predefined threshold, displaying a portion of the document associated with the first snippet of text that includes the first portion of text; and
when the gesture metric based on the first gesture is below the predefined threshold, ceasing to display the additional portion of text.

8. The device of claim 7, wherein the gesture metric is a measure of distance between the first contact and the second contact prior to detecting an end of the gesture.

9. The device of claim 7, wherein the gesture metric is a measure of a change in distance between the first contact and the second contact during the first gesture.

10. The device of claim 7, wherein:
detecting the end of the first gesture includes detecting liftoff of the first contact from the touch-sensitive surface; and
the gesture metric includes a measure of velocity of the first contact on the touch-sensitive surface prior to detecting the liftoff of the first contact.

11. A method, comprising:
at an electronic device having a display and a touch-sensitive surface:
concurrently displaying a plurality of snippets of text including a first snippet of text and a second snippet of text, wherein:
the first snippet of text includes first displayed snippet text corresponding to a first portion of text from a document associated with the first snippet of text; and
the second snippet of text includes second displayed snippet text corresponding to a second portion of text from a document associated with the second snippet of text;
detecting a first gesture associated with the first snippet of text, wherein detecting the first gesture includes detecting a first contact and a second contact on the touch-sensitive surface and detecting movement of the first contact relative to the second contact on the touch-sensitive surface; and
in response to detecting the movement of the first contact relative to the second contact:
modifying the first snippet of text to include an additional portion of text from the document associated with the first snippet of text that was not included in the first displayed snippet text, wherein the additional portion of text from the document associated with the first snippet of text includes:
additional text that occurs prior to the first displayed snippet text in the document associated with the first snippet of text; and
additional text that occurs after the first displayed snippet text in the document associated with the first snippet of text; and
maintaining display of the second snippet of text without adding any additional text from the document associated with the second snippet of text to the second snippet of text.

12. The method of claim 11, wherein the additional portion of text from the document associated with the first snippet of text is displayed adjacent to the first displayed snippet display on the display.

13. The method of claim 11, wherein the additional portion of text from the document associated with the first snippet of text is selected in accordance with the first gesture.

14. The method of claim 11, wherein:
the additional text that occurs prior to the first displayed snippet text is displayed in accordance with movement of the first contact on the touch sensitive surface; and
the additional text that occurs after the first displayed snippet text is displayed in accordance with movement of the second contact on the touch-sensitive surface.

15. The method of claim 11, including, while continuing to detect the first contact and the second contact on the touch-sensitive surface:
detecting that a gesture metric based on the first gesture is above a respective fading threshold, and in response to detecting that the gesture metric based on the first gesture is above the respective fading threshold, ceasing to display snippets of text other than the first snippet of text; and
detecting that the gesture metric based on the first gesture is below a redisplay threshold, and in response to detecting that the gesture metric based on the first gesture is below the redisplay threshold, redisplaying snippets of text other than the first snippet of text.

16. The method of claim 11, wherein a value of the redisplay threshold is related to a value of the fading threshold.

17. The method of claim 11, including, after detecting the movement of the first contact relative to the second contact:
detecting an end of the first gesture; and
in response to detecting the end of the first gesture:
when a gesture metric based on the first gesture is above a predefined threshold, displaying a portion of the document associated with the first snippet of text that includes the first portion of text; and
when the gesture metric based on the first gesture is below the predefined threshold, ceasing to display the additional portion of text.

18. The method of claim 17, wherein the gesture metric is a measure of distance between the first contact and the second contact prior to detecting an end of the gesture.

19. The method of claim 17, wherein the gesture metric is a measure of a change in distance between the first contact and the second contact during the first gesture.

20. The method of claim 17, wherein:
detecting the end of the first gesture includes detecting liftoff of the first contact from the touch-sensitive surface; and
the gesture metric includes a measure of velocity of the first contact on the touch-sensitive surface prior to detecting the liftoff of the first contact.

21. A graphical user interface on an electronic device with a display, a touch-sensitive surface, a memory, and one or more processors to execute one or more programs stored in the memory, the graphical user interface comprising:
a plurality of snippets of text including a first snippet of text and a second snippet of text, wherein:

the first snippet of text includes first displayed snippet text corresponding to a first portion of text from a document associated with the first snippet of text; and the second snippet of text includes second displayed snippet text corresponding to a second portion of from a document associated with the second snippet of text;

wherein:

a first gesture associated with the first snippet of text is detected, wherein detecting the first gesture includes detecting a first contact and a second contact on the touch-sensitive surface and detecting movement of the first contact relative to the second contact on the touch-sensitive surface; and in response to detecting the movement of the first contact relative to the second contact:

the first snippet of text is modified to include an additional portion of text from the document associated with the first snippet that was not included in the first displayed snippet text, wherein the additional portion of text from the document associated with the first snippet of text includes:

additional text that occurs prior to the first displayed snippet text in the document associated with the first snippet of text; and additional text that occurs after the first displayed snippet text in the document associated with the first snippet of text; and display of the second snippet of text is maintained without adding any additional text from the document associated with the second snippet of text to the second snippet of text.

22. A non-transitory computer readable storage medium storing one or more programs, the one or more programs comprising instructions, which when executed by an electronic device with a display and a touch-sensitive surface, cause the device to:

concurrently display a plurality of snippets of text including a first snippet of text and a second snippet of text, wherein:

the first snippet of text includes first displayed snippet text corresponding to a first portion of text from a document associated with the first snippet of text; and the second snippet of text includes second displayed snippet text corresponding to a second portion of text from a document associated with the second snippet of text;

detect a first gesture associated with the first snippet of text, wherein detecting the first gesture includes detecting a first contact and a second contact on the touch-sensitive surface and detecting movement of the first contact relative to the second contact on the touch-sensitive surface; and in response to detecting the movement of the first contact relative to the second contact:

modify the first snippet of text to include an additional portion of text from the document associated with the first snippet of text that was not included in the first displayed snippet text, wherein the additional portion of text from the document associated with the first snippet of text includes:

additional text that occurs prior to the first displayed snippet text in the document associated with the first snippet of text; and additional text that occurs after the first displayed snippet text in the document associated with the first snippet of text; and maintain display of the second snippet of text without adding any additional text from the document associated with the second snippet of text to the second snippet of text.

23. The non-transitory computer readable storage medium of claim 22, wherein the additional portion of text from the document associated with the first snippet of text is displayed adjacent to the first displayed snippet display on the display.

24. The non-transitory computer readable storage medium of claim 22, wherein the additional portion of text from the document associated with the first snippet of text is selected in accordance with the first gesture.

25. The non-transitory computer readable storage medium of claim 22, wherein:

the additional text that occurs prior to the first displayed snippet text is displayed in accordance with movement of the first contact on the touch sensitive surface; and the additional text that occurs after the first displayed snippet text is displayed in accordance with movement of the second contact on the touch-sensitive surface.

26. The non-transitory computer readable storage medium of claim 22, including instructions which cause the device to, while continuing to detect the first contact and the second contact on the touch-sensitive surface:

detect that a gesture metric based on the first gesture is above a respective fading threshold, and in response to detecting that the gesture metric based on the first gesture is above the respective fading threshold, ceasing to display snippets of text other than the first snippet of text; and detect that the gesture metric based on the first gesture is below a redisplay threshold, and in response to detecting that the gesture metric based on the first gesture is below the redisplay threshold, redisplaying snippets of text other than the first snippet of text.

27. The non-transitory computer readable storage medium of claim 22, wherein a value of the redisplay threshold is related to a value of the fading threshold.

28. The non-transitory computer readable storage medium of claim 22, including instructions which cause the device to, after detecting the movement of the first contact relative to the second contact:

detect an end of the first gesture; and in response to detecting the end of the first gesture:

when a gesture metric based on the first gesture is above a predefined threshold, display a portion of the document associated with the first snippet of text that includes the first portion of text; and when the gesture metric based on the first gesture is below the predefined threshold, cease to display the additional portion of text.

29. The non-transitory computer readable storage medium of claim 28, wherein the gesture metric is a measure of distance between the first contact and the second contact prior to detecting an end of the gesture.

30. The non-transitory computer readable storage medium of claim 28, wherein the gesture metric is a measure of a change in distance between the first contact and the second contact during the first gesture.

31. The non-transitory computer readable storage medium of claim 28, wherein:

instructions that cause the device to detect the end of the first gesture includes instructions which cause the device to detect liftoff of the first contact from the touch-sensitive surface; and the gesture metric includes a measure of velocity of the first contact on the touch-sensitive surface prior to detecting the liftoff of the first contact.

* * * * *

UNITED STATES PATENT AND TRADEMARK OFFICE
CERTIFICATE OF CORRECTION

| | | |
|---|---|---|
| PATENT NO. | : 8,572,481 B2 | Page 1 of 1 |
| APPLICATION NO. | : 13/077843 | |
| DATED | : October 29, 2013 | |
| INVENTOR(S) | : Charles J. Migos | |

It is certified that error appears in the above-identified patent and that said Letters Patent is hereby corrected as shown below:

In the Claims

Claim 21, col. 37, line 5, between the words "a second portion of" and "from", please insert --text --.

Signed and Sealed this
Eleventh Day of February, 2014

Michelle K. Lee
*Deputy Director of the United States Patent and Trademark Office*